(12) United States Patent
Choi et al.

(10) Patent No.: US 10,048,140 B2
(45) Date of Patent: Aug. 14, 2018

(54) SENSOR MODULE AND MOTION ASSISTANCE APPARATUS INCLUDING THE SAME

(71) Applicant: Samsung Electronics Co., Ltd., Suwon-si, Gyeonggi-do (KR)

(72) Inventors: Hyun Do Choi, Yongin-si (KR); Seungyong Hyung, Yongin-si (KR); Jeonghun Kim, Hwaseong-si (KR); Se-Gon Roh, Suwon-si (KR); Minhyung Lee, Anyang-si (KR); Youn Baek Lee, Yongin-si (KR); Jongwon Lee, Suwon-si (KR); Byungjune Choi, Gunpo-si (KR)

(73) Assignee: Samsung Electronics Co, Ltd., Gyeonggi-do (KR)

( * ) Notice: Subject to any disclaimer, the term of this patent is extended or adjusted under 35 U.S.C. 154(b) by 107 days.

(21) Appl. No.: 15/083,541

(22) Filed: Mar. 29, 2016

(65) Prior Publication Data
US 2017/0059422 A1    Mar. 2, 2017

(30) Foreign Application Priority Data
Aug. 31, 2015   (KR) .................. 10-2015-0123089

(51) Int. Cl.
*G01L 1/22* (2006.01)
*G01L 5/22* (2006.01)
(Continued)

(52) U.S. Cl.
CPC .................. *G01L 1/22* (2013.01); *G01L 1/00* (2013.01); *G01L 1/16* (2013.01); *G01L 1/18* (2013.01);
(Continued)

(58) Field of Classification Search
CPC ..... G01L 1/22; G01L 1/00; G01L 1/16; G01L 1/18; G01L 1/20; G01L 1/24; G01L 5/226; G01L 5/161
(Continued)

(56) References Cited

U.S. PATENT DOCUMENTS 4,112,292 A * 9/1978 Varvel .................. G06K 7/087
                                                235/449
4,134,539 A    1/1979 Hopkinson
(Continued)

FOREIGN PATENT DOCUMENTS

EP          1 655 689 A1    5/2006
KR        101169943 B1     8/2012
(Continued)

OTHER PUBLICATIONS

R.A. Brookhuis et al., "3D force sensor for biomechanical applications", Sensors and Actuators A: Physical, vol. 182, Aug. 2012, pp. 28-33.
(Continued)

*Primary Examiner* — Harshad R Patel
*Assistant Examiner* — Octavia Hollington
(74) *Attorney, Agent, or Firm* — Harness, Dickey & Pierce, P.L.C.

(57) ABSTRACT

Provided is a sensor device including a receiving body including an inserting space, an inserting body disposed in the inserting space, a first sensor assembly including at least one sensor provided between an inner surface of the receiving body and an outer surface of the inserting body, and a second sensor assembly including at least one sensor provided between another inner surface of the receiving body and another outer surface of the inserting body.

25 Claims, 33 Drawing Sheets

(51) Int. Cl.
*G01L 1/00* (2006.01)
*G01L 1/16* (2006.01)
*G01L 1/18* (2006.01)
*G01L 1/20* (2006.01)
*G01L 1/24* (2006.01)

(52) U.S. Cl.
CPC .................. *G01L 1/20* (2013.01); *G01L 1/24* (2013.01); *G01L 5/226* (2013.01)

(58) Field of Classification Search
USPC .................. 73/862.045, 862.041–862.046
See application file for complete search history.

(56) References Cited

U.S. PATENT DOCUMENTS

| | | | | |
|---|---|---|---|---|
| 4,599,511 | A * | 7/1986 | Stiller | G06K 7/14 235/459 |
| 6,044,717 | A | 4/2000 | Biegelsen et al. | |
| 6,461,305 | B1 * | 10/2002 | Schnall | A61B 5/02007 600/342 |
| 6,501,210 | B1 | 12/2002 | Ueno | |
| 6,622,575 | B1 * | 9/2003 | Nagata | A61B 5/225 73/862.042 |
| 7,483,731 | B2 * | 1/2009 | Hoarau | A61B 5/14552 600/310 |
| 7,772,960 | B2 | 8/2010 | Baker | |
| 8,042,413 | B2 * | 10/2011 | Schaffner | B23K 20/10 73/862.68 |
| 8,269,731 | B2 | 9/2012 | Molne | |
| 8,281,670 | B2 * | 10/2012 | Larkin | A61B 34/71 73/862.045 |
| 8,564,554 | B2 | 10/2013 | Laurent et al. | |
| 2008/0249393 | A1 * | 10/2008 | Finarov | A61B 5/02241 600/391 |
| 2009/0019949 | A1 | 1/2009 | Rothkopf et al. | |
| 2013/0042702 | A1 | 2/2013 | Huang et al. | |
| 2014/0083207 | A1 | 3/2014 | Eventoff | |
| 2014/0253305 | A1 | 9/2014 | Rosenberg et al. | |
| 2015/0084909 | A1 | 3/2015 | Worfolk et al. | |
| 2015/0112331 | A1 | 4/2015 | Olson et al. | |
| 2015/0112486 | A1 | 4/2015 | Larkin et al. | |

FOREIGN PATENT DOCUMENTS

| | | |
|---|---|---|
| KR | 1020140114918 | 9/2014 |
| KR | 101473947 B1 | 12/2014 |

OTHER PUBLICATIONS

David J. Cappelleri et al., "A two dimensional vision-based force sensor for microrobotic applications", Sensors and Actuators A: Physical, vol. 171, Issue 2, Nov. 2011, pp. 340-351.

Peter Baki et al., "Design and characterization of a novel, robust, tri-axial force sensor", Sensors and Actuators A: Physical, vol. 192, Apr. 1, 2013, pp. 101-110.

Jagoda A. Dobrzynska et al., "Flexible polyimide-based force sensor", Sensors and Actuatros A: Physical, vol. 173, Issue 1, Jan. 2012, pp. 127-135.

G. De Maria et al., Force/tactile sensor for robotic applications, Sensors and Actuators A: Physical, vol. 175, Mar. 2012, pp. 60-72.

Dangxiao Wang et al,, "A Flexible Concept for Designing Multiaxis Force/Torque Sensors Using Force Closure Theorem", IEEE Transactions on Instrumentation and Measurement, vol. 62, No. 7, Jul. 2013.

Mohsin I. Tiwana et al., "A review of tactile sensing technologies with applications in biomedical engineering", Sensors and Actuators A: Physical, vol. 179, Jun. 2012, pp. 17-31.

Daniel M. Vogt et al., Design and Characterization of a Soft Multi-Axis Force Sensor Using Embedded Microfluidic Channels, IEEE Sensors Journal, vol. 13, No. 10, Oct. 2013.

Extended European Search Report dated Jan. 26, 2017 for corresponding EP Application No. 16170148.7.

* cited by examiner

SENSOR MODULE AND MOTION ASSISTANCE APPARATUS INCLUDING THE SAME

CROSS-REFERENCE TO RELATED APPLICATION

This application claims under 35 U.S.C. § 119 to Korean Patent Application No. 10-2015-0123089, filed on Aug. 31, 2015, in the Korean Intellectual Property Office, the entire contents of which are incorporated herein by reference in its entirety.

BACKGROUND

1. Field

At least one example embodiment relates to a sensor module and/or a motion assistance apparatus including the same.

2. Description of the Related Art

A force sensor used for force measurement may include, for example, a deformation portion configured to mechanically deform in response to a force desired to be measured, a sensor portion configured to sense the deformation of the deformation portion and generate a signal based thereon, and an electronic circuit configured to process the signal generated by the sensor portion.

The deformation may be sensed using a strain gauge, a piezoelectric material, an electromagnetic method, an optical method, and the like. The strain gauge may be widely used due to its accuracy and usability.

SUMMARY

Some example embodiments relate to a sensor module.

In some example embodiments, the sensor module may include a receiving body including an inserting space, an inserting body disposed in the inserting space, a first sensor assembly including at least one sensor provided between an inner surface of the receiving body and an outer surface of the inserting body, and a second sensor assembly including at least one sensor provided between another inner surface of the receiving body and another outer surface of the inserting body.

Each of the first sensor assembly and the second sensor assembly may include a force sensor of which a resistance decreases with an increase in a force applied thereto.

The sensors may include force sensitive resistance (FSR) sensors.

The force sensor may include a sensing plate disposed between the inserting body and the receiving body, a connecting line connected to the sensing plate and disposed lengthwise in a length direction of the inserting body, a flexible plate configured to enclose the sensing plate and the connecting line, and a connecting terminal connected to the connecting line and exposed to an external portion of the flexible plate.

The receiving body or the inserting body may be formed using a flexible material.

The first sensor assembly may include a first front sensor and a first rear sensor disposed to be spaced apart from each other in a length direction of the inserting body, and the second sensor assembly may include a second front sensor and a second rear sensor disposed to be spaced apart from each other in the length direction of the inserting body.

The first sensor assembly may include a first left sensor and a first right sensor disposed to be spaced apart from each other in a direction perpendicular to a length direction of the inserting body, and the second sensor assembly may include a second left sensor and a second right sensor disposed to be spaced apart from each other in the direction perpendicular to the length direction of the inserting body.

The first sensor assembly may include three first force sensors which are disposed non-collinearly, and the second sensor assembly may include three second force sensors configured to overlap the three first force sensors, respectively.

The sensor module may further include a separation preventing portion configured to prevent a separation of the inserting body from the receiving body.

The inserting body may include a first guide slot configured to elongate in a thickness direction of the inserting body, and the sensor module may further include a first guide pin to be inserted into the first guide slot to restrict a moving range of the inserting body in an internal portion of the receiving body.

The inserting body may further include a second guide slot configured to be spaced apart from the first guide slot and elongate in the thickness direction of the inserting body, and the sensor module may further include a second guide pin to be inserted into the second guide slot to restrict a rotating range of the inserting body relative to the receiving body in conjunction with the first guide pin.

The inserting body may include pressurizing portions configured to protrude at positions corresponding to the sensors.

Other example embodiments relate to a sensor module.

In some example embodiments, the sensor module may include an inserting body with a thickness less than a width and a length, a first sensor assembly and a second sensor assembly, each including at least one sensor, disposed on opposite sides from the inserting body in a thickness direction of the inserting body, and a receiving body configured to enclose the inserting body, the first sensor assembly, and the second sensor assembly.

The sensor module may include a sensing board connected to the first sensor assembly and the second sensor assembly to determine a direction of a moment or a force applied to one of the receiving body and the inserting body based on information sensed by the first sensor assembly and the second sensor assembly.

The first sensor assembly may include a first front sensor and a first rear sensor disposed to be spaced apart from each other in a length direction of the inserting body, and the second sensor assembly may include a second front sensor configured to overlap the first front sensor in the thickness direction of the inserting body, and a second rear sensor configured to overlap the first rear sensor in the thickness direction of the inserting body.

The first sensor assembly may further include a first side sensor disposed to be spaced apart from the first front sensor and the first rear sensor in a width direction of the inserting body, and the second sensor assembly may further include a second side sensor configured to overlap the first rear sensor in the thickness direction of the inserting body.

The first sensor assembly may include a first left sensor and a first right sensor disposed to be spaced part from each other in a width direction of the inserting body, and the second sensor assembly may include a second left sensor configured to overlap the first left sensor in the thickness direction of the inserting body, and a second right sensor configured to overlap the first right sensor in the thickness direction of the inserting body.

The sensing board may be configured to determine a direction of a force applied in the thickness direction of the inserting body, and directions of two moments applied about axes corresponding to a width direction and a length direction of the inserting body, respectively.

The first sensor assembly may include three first sensors which are disposed non-collinearly, and the second sensor assembly may include three second sensors configured to overlap the three first sensors, respectively, in the thickness direction of the inserting body.

The first sensor assembly may include two first sensors disposed to be spaced apart from each other, and the second sensor assembly may include two second sensors configured to overlap the two first sensors, respectively, in the thickness direction of the inserting body.

Other example embodiments relate to a sensor module.

In some example embodiments, the sensor module may include a plate including a first side and a second side which are opposite to each other, a first sensor assembly including at least one sensor fixed to face and be spaced apart from the first side of the plate to sense a force applied to the plate in a first direction through a contact with the plate, and a second sensor assembly including at least one sensor fixed to face and be spaced apart from the second side of the plate to sense a force applied to the plate in a second direction opposite to the first direction through a contact with the plate.

Each of the first sensor assembly and the second sensor assembly may include a force sensor of which a resistance decreases with an increase in a force applied thereto.

The sensors may include FSR sensors.

The first sensor assembly may include three first sensors which are disposed non-collinearly, and the second sensor assembly may include three second sensors configured to overlap the three first sensors, respectively.

The sensor module may further include a sensing board connected to the first sensor assembly and the second sensor assembly to determine a direction of a moment or a force applied to the plate based on information sensed by the first sensor assembly and the second sensor assembly.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
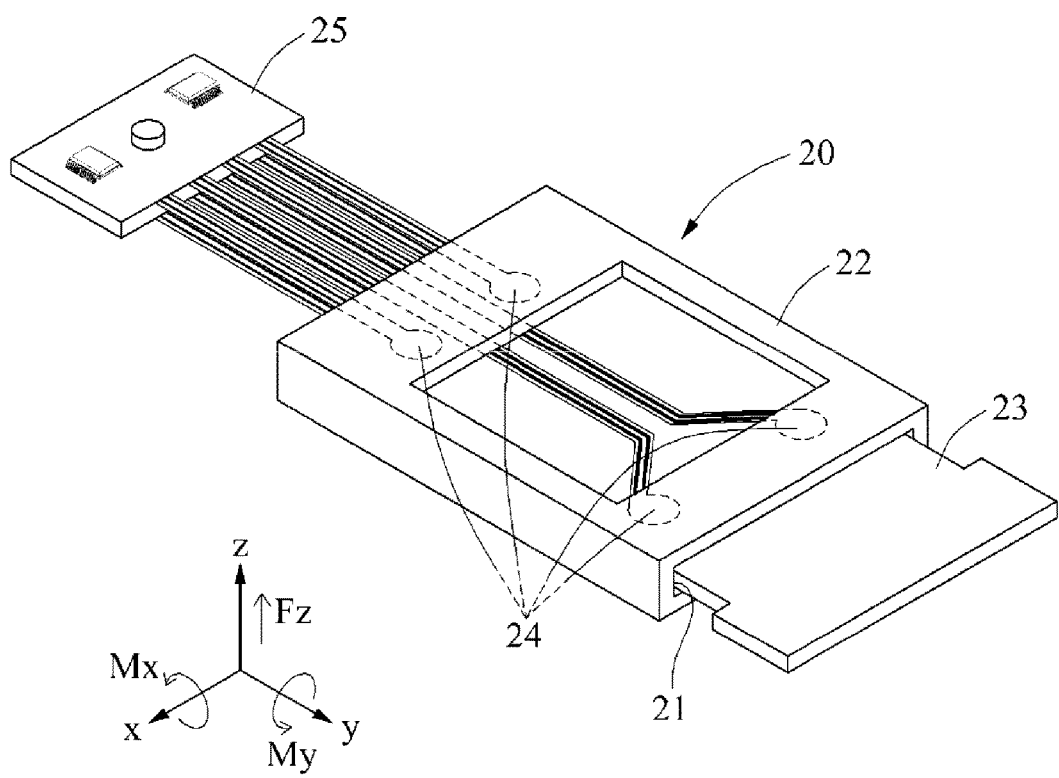
FIG. 1 is a perspective view illustrating a sensor module according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Various example embodiments will now be described more fully with reference to the accompanying drawings in which some example embodiments are shown. In the drawings, the thicknesses of layers and regions are exaggerated for clarity.

FIG. 1 is a perspective view illustrating a sensor module according to at least one example embodiment.

Referring to FIG. 1, a sensor module 2 may include a receiving body 20, an inserting body 23, sensors 24, and a sensing board 25.

The receiving body 20 may include an inserting space 21 in which the inserting body 23 is to be disposed, and a supporting plate 22 configured to support a top and a bottom of the inserting body 23. The inserting space 21 may be a space enclosed by the supporting plate 22. For example, the receiving body 20 may generally have a shape with a thickness less than a width and a length. The receiving body 20 may be formed using a flexible material. However, the shape and the material of the receiving body 20 are not limited thereto.

For example, the receiving body 20 may be provided in a shape of a box having a hollow therein in which the inserting space 21 is formed, as shown in FIG. 1. In another example, the receiving body 20 may be provided in a shape of two plates which are spaced apart from each other. In this example, a space formed between the two plates may correspond to the inserting space 21. The two plates may be disposed in parallel. One side of one of the two plates may be connected to one side of the other. In detail, the receiving body 20 may roughly have a cross-section of a flattened-U shape. The receiving body 20 may only need to include the inserting space 21 in which the inserting body 23 is to be disposed. Thus, the shape of the receiving body 20 is not limited thereto.

The inserting body 23 may be disposed in the receiving body 20. The inserting body 23 may have a shape with a thickness less than a width and a length, for example, a shape of a thin plate. The inserting body 23 may be a plate including a first side and a second side which are opposite to each other. The inserting body 23 may be formed of a flexible material. However, the shape and the material of the inserting body 23 are not limited thereto. A cross-section of the inserting body 23 may be smaller than a cross-section of the inserting space 21. The inserting body 23 may move or rotate in the inserting space 21 within a predetermined range.

Although FIG. 1 illustrates a case in which the inserting body 23 is not connected to the receiving body 20, the inserting body 23 may be connected to the receiving body 20. One side of the inserting body 23 may be fixed to one side of the receiving body 20. In detail, the inserting body 23 may have a shape of a cantilever of which one end is a free end and another end is a fixed end. In this example, in order for the inserting body 23 to be bent by an external force to sufficiently pressurize a sensing plate which will be described later, the fixed end of the inserting body 23 may be sufficiently distant from the free end of the inserting body 23, when compared to a portion of the inserting body 23 corresponding to the sensing plate. The inserting body 23 and the receiving body 20 may be provided as an integral body. An example in which the inserting body 23 and the receiving body 20 are connected to each other or provided as an integral body will be described with reference to FIGS. 17, 18, 19, and 20.

The sensors 24 may be disposed between the receiving body 20 and the inserting body 23. The sensors 24 may be disposed on both sides of the inserting body 23. For example, the sensors 24 may be force sensors of which resistances decrease with an increase in an applied force, pressure sensors, or electromyography (EMG) sensors. At least one of the plurality of sensors 24 may be provided between an inner surface of the receiving body 20 and an outer surface of the inserting body 23, and another at least one of the plurality of sensors 24 may be provided between another inner surface of the receiving body 20 and another outer surface of the inserting body 23. For example, the sensors 24 may be positioned between the receiving body 20 and the inserting body without being fixed to the receiving body 20 and the inserting body 23. In another example, the sensors 24 may be fixed to one of the receiving body 20 and the inserting body 23. The sensors 24 may be fixed to face and be spaced apart from one side of the inserting body 23, thereby sensing a force applied to the inserting body 23 in one direction through a contact with the inserting body 23.

The sensing board 25 may be connected to the plurality of sensors 24 to determine a direction of a force or a moment applied to one of the receiving body 20 and the inserting body 23 based on information sensed by the sensors 24.

Figure 2:
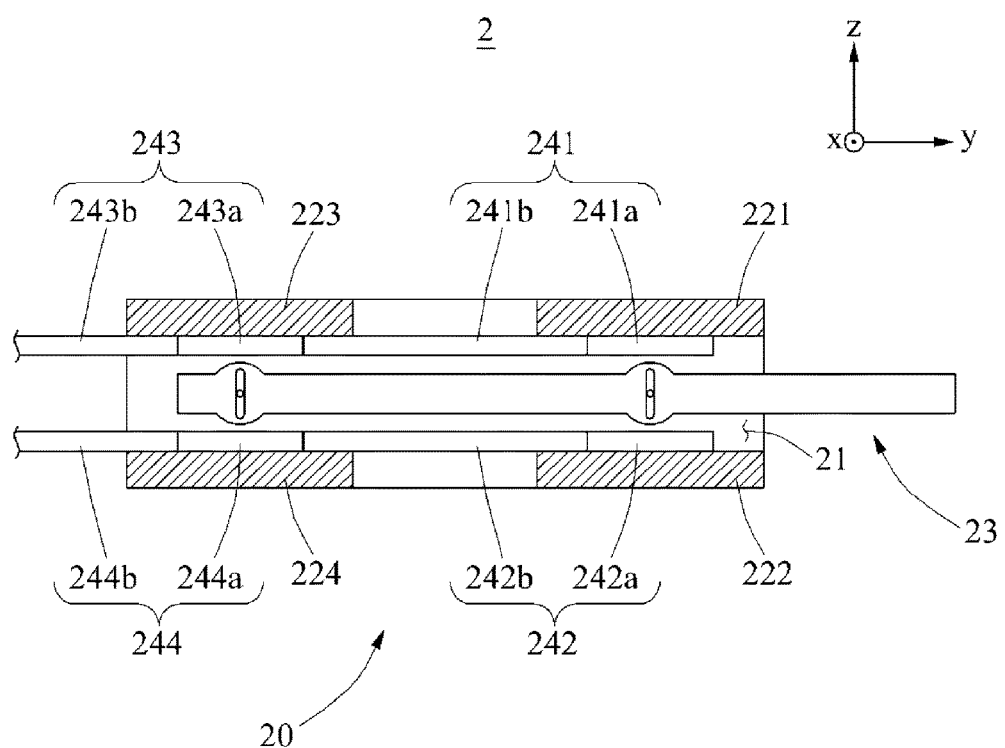
FIG. 2 is a cross-sectional view illustrating a sensor module cut along a plane y-z according to at least one example embodiment.
Figure 3:
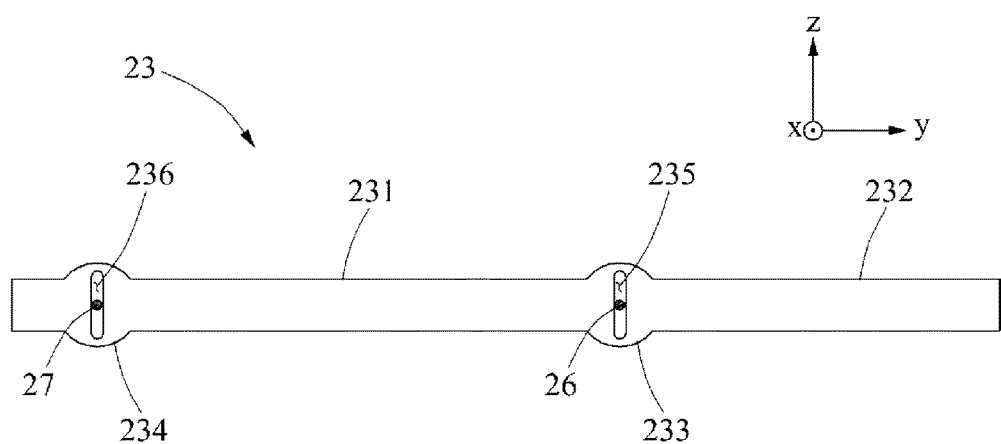
FIG. 3 is a cross-sectional view illustrating an inserting body according to at least one example embodiment.

FIG. 2 is a cross-sectional view illustrating the sensor module 2 cut along a plane y-z according to at least one example embodiment, and FIG. 3 is a cross-sectional view illustrating the inserting body 23 according to at least one example embodiment.

Referring to FIGS. 2 and 3, the sensor module 2 may include the receiving body 20 including the inserting space 21, the inserting body 23, a first sensor 241, a second sensor 242, a third sensor 243, a fourth sensor 244, and a separation preventing portion.

The first sensor 241 and the third sensor 243 disposed above the inserting body 23 may be referred to as a first sensor assembly, and the second sensor 242 and the fourth sensor 244 disposed below the inserting body 23 may be referred to as a second sensor assembly. The first sensor assembly and the second sensor assembly may be disposed on opposite sides from the inserting body 23. In detail, each of the first sensor assembly and the second sensor assembly may include at least one sensor, and the first sensor assembly and the second sensor assembly may be disposed on opposite sides from the inserting body 23 in a thickness direction of the inserting body 23.

The receiving body 20 may include a first supporting plate disposed above the inserting body 23, and a second supporting plate disposed below the inserting body 23. Although the first supporting plate and the second supporting plate are illustrated separately, the first supporting plate and the second supporting plate may be formed as an integral body. In detail, the receiving body 20 may enclose the first sensor assembly and the second sensor assembly.

Depending on positions, the first supporting plate may include a first front supporting plate 221 which is close to an exposed portion of the inserting body 23, and a first rear supporting plate 223 which is distant from the exposed portion of the inserting body 23. Although the first front supporting plate 221 and the first rear supporting plate 223 are illustrated separately, the first front supporting plate 221 and the first rear supporting plate 223 may be formed as an integral body.

Depending on positions, the second supporting plate may include a second front supporting plate 222 which is close to the exposed portion of the inserting body 23, and a second rear supporting plate 224 which is distant from the exposed portion of the inserting body 23. Although the second front supporting plate 222 and the second rear supporting plate 224 are illustrated separately, the second front supporting plate 222 and the second rear supporting plate 224 may be formed as an integral body. The second front supporting plate 222 and the second rear supporting plate 224 may overlap the first front supporting plate 221 and the first rear supporting plate 223, respectively, based on the thickness direction of the inserting body 23, for example, a z-axial direction.

The inserting body 23 may include an inserting plate 231 to be disposed in the inserting space 21, an applying portion 232 formed at an end portion of the inserting plate 231, and a pressurizing portion to be in contact with the first through fourth sensors 241, 242, 243, and 244. An external force may be input into the applying portion 232.

By a force or a moment input into one side of the inserting body 23, the inserting body 23 may move or rotate relative to the receiving body 20. Conversely, by a force or a moment input into one side of the receiving body 20, the receiving body 20 may move or rotate relative to the inserting body 23.

The pressurizing portion may be, for example, a protrusion formed to protrude from the inserting plate 231. By the foregoing shape, when a force or a moment is applied to the receiving body 20 or the inserting body 23, a force to be applied to the first through fourth sensors 241, 242, 243, and 244 may be increased by the applied force or moment.

Depending on positions, the pressurizing portion may include a front pressurizing portion 233 which is close to the exposed portion of the inserting body 23, and a rear pressurizing portion 234 which is distant from the exposed portion of the inserting body 23. The front pressurizing portion 233 may overlap (or, alternatively, be positioned in the z-axial width direction to correspond to) the first front supporting plate 221 and the second front supporting plate 222 based on the thickness direction of the inserting body 23, for example, the z-axial direction. The rear pressurizing portion 234 may overlap (or, alternatively, be positioned in the z-axial width direction to correspond to) the first rear supporting plate 223 and the second rear supporting plate 224 based on the thickness direction of the inserting body 23, for example, the z-axial direction.

The inserting body 23 may include a guide slot configured to restrict a moving range of the inserting body 23. For example, the guide slot may elongate in the thickness direction of the inserting body 23.

The separation preventing portion may be inserted into the guide slot, thereby preventing a separation of the inserting body 23 from the receiving body 20. For example, the separation preventing portion may be provided in a shape of a pin. In this example, the separation preventing portion may also be referred to as a guide pin.

For example, the guide slot may be provided in a thickest portion of the inserting body 23. In the foregoing arrangement, by maximizing a length of the guide slot, a sufficient moving distance of the inserting body 23 may be secured.

In some example embodiments, the inserting body 23 may include a front guide slot 235 disposed in the front pressurizing portion 233, and a rear guide slot 236 disposed in the rear pressurizing portion 234. The separation preventing portion may include, for example, a front separation preventing portion (or, alternatively, a front guide pin) 26 to be inserted into the front guide slot 235, and a rear separation preventing portion (or, alternatively, a rear guide pin) 27 to be inserted into the rear guide slot 236. The two pairs of the guide slot and the separation preventing portion may restrict a rotating range of the inserting body 23 relative to the receiving body 20. Meanwhile, the number and positions of the guide slots and the number and positions of the separation preventing portions are not limited thereto. For example, only a single guide slot may be provided at a center of the inserting body 23. Further, only a single separation preventing portion may be provided.

The first sensor 241 may be disposed between the first front supporting plate 221 and the inserting body 23. For example, the first sensor 241 may be disposed between an inner surface of the first front supporting plate 221 and the front pressurizing portion 233. The first sensor 241 may also be referred to as a first front sensor. The first sensor 241 may include a first front sensing plate 241a configured to sense a force applied between the inner surface of the first front supporting plate 221 and the front pressurizing portion 233, and a first front sensor connecting line 241b configured to connect the first front sensing plate 241a to the sensing board 25.

The second sensor 242 may be disposed between the second front supporting plate 222 and the inserting body 23. For example, the second sensor 242 may be disposed between an inner surface of the second front supporting plate 222 and the front pressurizing portion 233. The second sensor 242 may also be referred to as a second front sensor. The second sensor 242 may include a second front sensing plate 242a configured to sense a force applied between the inner surface of the second front supporting plate 222 and the front pressurizing portion 233, and a second front sensor connecting line 242b configured to connect the second front sensing plate 242a to the sensing board 25.

The third sensor 243 may be disposed between the first rear supporting plate 223 and the inserting body 23. For example, the third sensor 243 may be disposed between an inner surface of the first rear supporting plate 223 and the rear pressurizing portion 234. The third sensor 243 may also be referred to as a first rear sensor. The third sensor 243 may include a first rear sensing plate 243a configured to sense a force applied between the inner surface of the first rear supporting plate 223 and the rear pressurizing portion 234, and a first rear sensor connecting line 243b configured to connect the first rear sensing plate 243a to the sensing board 25.

The fourth sensor 244 may be disposed between the second rear supporting plate 224 and the inserting body 23. For example, the fourth sensor 244 may be disposed between an inner surface of the second rear supporting plate 224 and the rear pressurizing portion 234. The fourth sensor 244 may also be referred to as a second rear sensor. The fourth sensor 244 may include a second rear sensing plate 244a configured to sense a force applied between the inner surface of the second rear supporting plate 224 and the rear pressurizing portion 234, and a second rear sensor connecting line 244b configured to connect the second rear sensing plate 244a to the sensing board 25.

In detail, the first sensor assembly may include the first front sensor 241 and the first rear sensor 243 which are disposed to be spaced apart from each other in a length direction or an inserting direction of the inserting body 23.

Similarly, the second sensor assembly may include the second front sensor 242 and the second rear sensor 244 which are disposed to be spaced apart from each other in the length direction or the inserting direction of the inserting body 23. In further detail, the second sensor assembly may include the second front sensor 242 configured to overlap (or, alternatively, be positioned in the z-axial width direction to correspond to) the first front sensor 241 in the thickness direction of the inserting body 23, and the second rear sensor 244 configured to overlap (or, alternatively, be positioned in the z-axial width direction to correspond to) the first rear sensor 243 in the thickness direction of the inserting body 23.

Meanwhile, the first front sensor connecting line 241b, the second front sensor connecting line 242b, the first rear sensor connecting line 243b, and the second rear sensor connecting line 244b may be disposed lengthwise in the inserting direction of the inserting body 23. The first front sensor connecting line 241b and the first rear sensor connecting line 243b may be disposed on the same plane. In the foregoing structure, the overall thickness of the sensor module 2 may be reduced. Similarly, the second front sensor connecting line 242b and the second rear sensor connecting line 244b may be disposed on the same plane.

Meanwhile, dissimilar to the drawings, each of the first front supporting plate 221, the first rear supporting plate 223, the second front supporting plate 222, and the second rear supporting plate 224 may include a pressurizing portion provided to protrude toward an inner side of the receiving body 20. In detail, the receiving body 20 and/or the inserting body 23 may include pressurizing portions provided at positions corresponding to the sensors 241, 242, 243, and 244, respectively. The pressurizing portions may be protrusions configured to protrude toward the sensors 241, 242, 243, and 244. When the receiving body 20 or the inserting body 23 is formed using a flexible material, a separate pressurizing portion may not be provided. In this example, by disposing sensors close to both end portions of the inserting body 23 inserted into the receiving body 20, the sensors may be pressurized between the inserting body 23 and the receiving body 20 when the inserting body 23 moves or rotates relative to the receiving body 20.

FIGS. 4A, 4B, 4C, and 4D are cross-sectional views illustrating operational states of the sensor module 2 when a force or a moment is applied to the sensor module 2 in various directions according to at least one example embodiment.

Figure 4A:
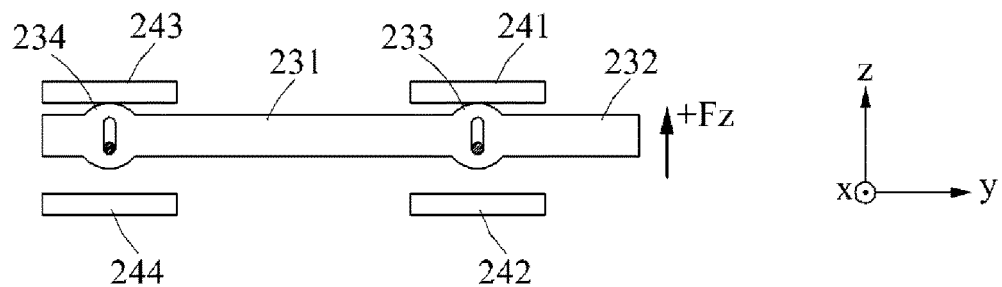
FIGS. 4A, 4B, 4C, and 4D are cross-sectional views illustrating operational states of a sensor module when a force or a moment is applied to the sensor module in various directions according to at least one example embodiment.

In detail, FIG. 4A illustrates an operational state of the sensor module 2 when a force in a positive direction of a z axis is applied. Referring to FIG. 4A, when a force in the positive direction of the z axis is applied to the inserting body 23, the inserting body 23 may pressurize the first front sensor 241 and the first rear sensor 243. When a moment about an x axis is not applied to the inserting body 23, forces of equal magnitudes may be applied to the first front sensor 241 and the first rear sensor 243. Thus, when forces of equal magnitudes are sensed by the first front sensor 241 and the first rear sensor 243, the sensing board 25 may determine that a force in the positive direction of the z axis is applied to the inserting body 23 and a moment about the x axis is not applied to the inserting body 23. In this example, although the force sensed by the first front sensor 241 differs from the force sensed by the first rear sensor 243, the sensing board 25 may determine, in view of errors in sensors and errors caused by other miscellaneous loads, that a force in the positive direction of the z axis is applied to the inserting body 23 and a moment about the x axis is not applied to the inserting body 23 when a difference between the force sensed by the first front sensor 241 and the force sensed by the first rear sensor 243 is less than a set value.

Figure 4B:
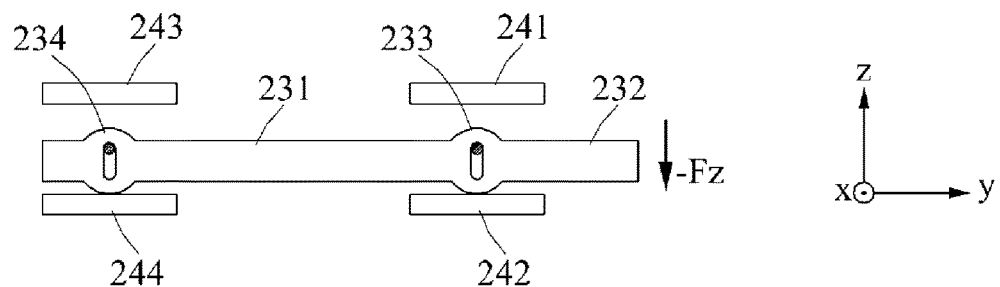

FIG. 4B illustrates an operational state of the sensor module 2 when a force in a negative direction of the z axis is applied. Referring to FIG. 4B, when a force in the negative direction of the z axis is applied to the inserting body 23, the inserting body 23 may pressurize the second front sensor 242 and the second rear sensor 244. When a moment about the x axis is not applied to the inserting body 23, forces of equal magnitudes may be applied to the second front sensor 242 and the second rear sensor 244. Thus, when forces of equal magnitudes are sensed by the second front sensor 242 and the second rear sensor 244, the sensing board 25 may determine that a force in the negative direction of the z axis is applied to the inserting body 23 and a moment about the x axis is not applied to the inserting body 23. In this example, although the force sensed by the second front sensor 242 differs from the force sensed by the second rear sensor 244, the sensing board 25 may determine, in view of errors in sensors and errors caused by other miscellaneous loads, that a force in the negative direction of the z axis is applied to the inserting body 23 and a moment about the x axis is not applied to the inserting body 23 when a difference between the force sensed by the second front sensor 242 and the force sensed by the second rear sensor 244 is less than a set value.

Figure 4C:
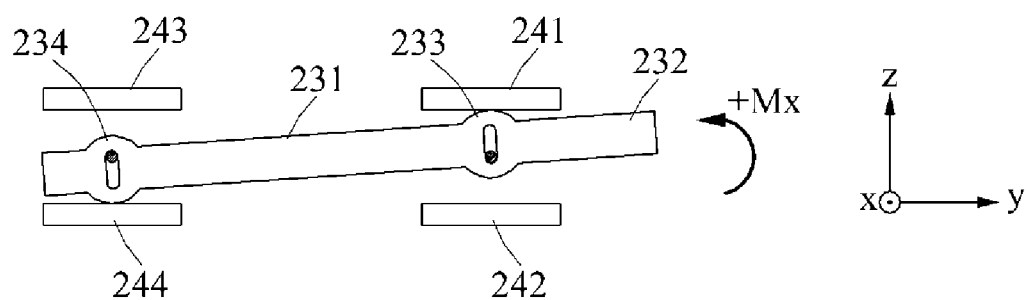

FIG. 4C illustrates an operational state of the sensor module 2 when a moment in a counterclockwise direction of the x axis is applied. Referring to FIG. 4C, when a moment in the counterclockwise direction of the x axis is applied to the inserting body 23, the inserting body 23 may pressurize the first front sensor 241 and the second rear sensor 244. When a force is not applied to the inserting body 23 in a z-axial direction, forces of equal magnitudes may be applied to the first front sensor 241 and the second rear sensor 244. Thus, when forces of equal magnitudes are sensed by the first front sensor 241 and the second rear sensor 244, the sensing board 25 may determine that a moment in the counterclockwise direction of the x axis is applied to the inserting body 23 and a force in the z-axial direction is not applied to the inserting body 23. In this example, although the force sensed by the first front sensor 241 differs from the force sensed by the second rear sensor 244, the sensing board 25 may determine, in view of errors in sensors and errors caused by other miscellaneous loads, that a moment in the counterclockwise direction of the x axis is applied to the inserting body 23 and a force in the z-axial direction is not applied to the inserting body 23 when a difference between the force sensed by the first front sensor 241 and the force sensed by the second rear sensor 244 is less than a set value.

Figure 4D:
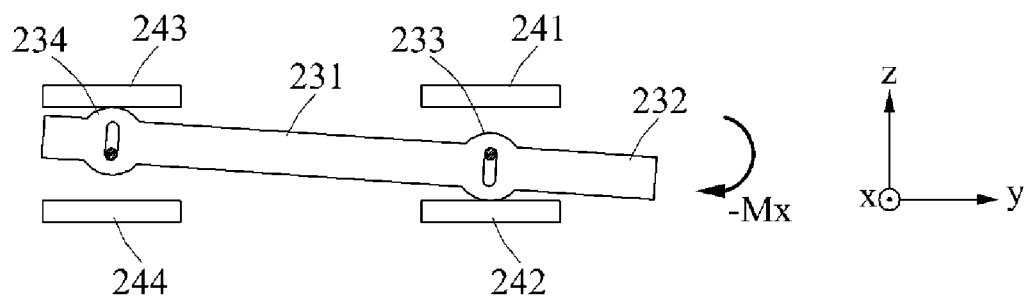

FIG. 4D illustrates an operational state of the sensor module 2 when a moment in a clockwise direction of the x axis is applied. Referring to FIG. 4D, when a moment in the clockwise direction of the x axis is applied to the inserting body 23, the inserting body 23 may pressurize the second front sensor 242 and the first rear sensor 243. When a force in the z-axial direction is not applied to the inserting body 23, forces of equal magnitudes may be applied to the second front sensor 242 and the first rear sensor 243. Thus, when forces of equal magnitudes are sensed by the second front sensor 242 and the first rear sensor 243, the sensing board 25 may determine that a moment in the clockwise direction of the x axis is applied to the inserting body 23 and a force in the z-axial direction is not applied to the inserting body 23. In this example, although the force sensed by the second front sensor 242 differs from the force sensed by first rear sensor 243, the sensing board 25 may determine, in view of errors in sensors and errors caused by other miscellaneous loads, that a moment in the clockwise direction of the x axis is applied to the inserting body 23 and a force in the z-axial direction is not applied to the inserting body 23 when a difference between the force sensed by the second front sensor 242 and the force sensed by first rear sensor 243 is less than a set value.

In summary, the sensing board 25 may determine a direction of a force applied in the thickness direction of the inserting body 23, for example, the z-axial direction, and a direction of a moment applied about an axis corresponding to a width direction of the inserting body 23, for example, the x-axial direction.

FIGS. 5A, 5B, 5C, and 5D are cross-sectional views illustrating operational states of the sensor module 2 when a force and a moment are simultaneously applied to the sensor module 2 in various directions according to at least one example embodiment.

Figure 5A:
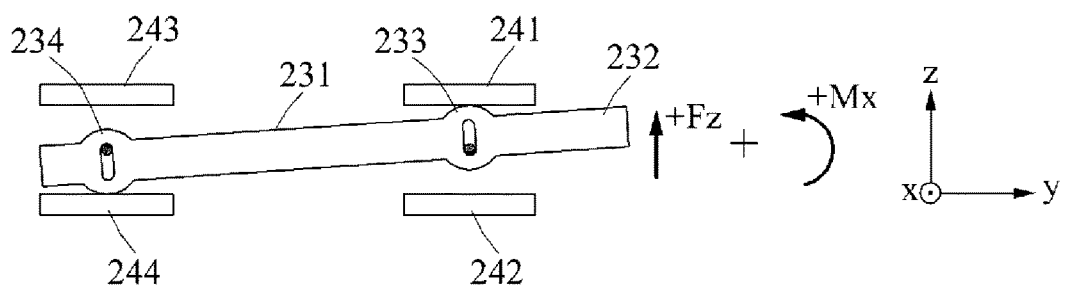
FIGS. 5A, 5B, 5C, and 5D are cross-sectional views illustrating operational states of a sensor module when a force and a moment are simultaneously applied to the sensor module in various directions according to at least one example embodiment.

FIG. 5A illustrates an operational state of the sensor module 2 when a force in a positive direction of a z axis and a moment in a counterclockwise direction of an x axis are simultaneously applied. Referring to FIG. 5A, when a force in the positive direction of the z axis and a moment in the counterclockwise direction of the x axis are simultaneously applied to the inserting body 23, the inserting body 23 may pressurize the first front sensor 241 and the second rear sensor 244. In this example, due to the force in the positive direction of the z axis, a force sensed by the first front sensor 241 may be greater than a force sensed by the second rear sensor 244. Thus, the sensing board 25 may determine that a force in the positive direction of the z axis and a moment in the counterclockwise direction of the x axis are applied to the inserting body 23 when forces are sensed by the first front sensor 241 and the second rear sensor 244 and the force sensed by the first front sensor 241 is greater than the force sensed by the second rear sensor 244. In this example, the sensing board 25 may determine, in view of errors in sensors and errors caused by other miscellaneous loads, whether a force in a z-axial direction is applied based on whether a difference in magnitude between the force sensed by the first front sensor 241 and the force sensed by the second rear sensor 244 exceeds a set value.

Figure 5B:
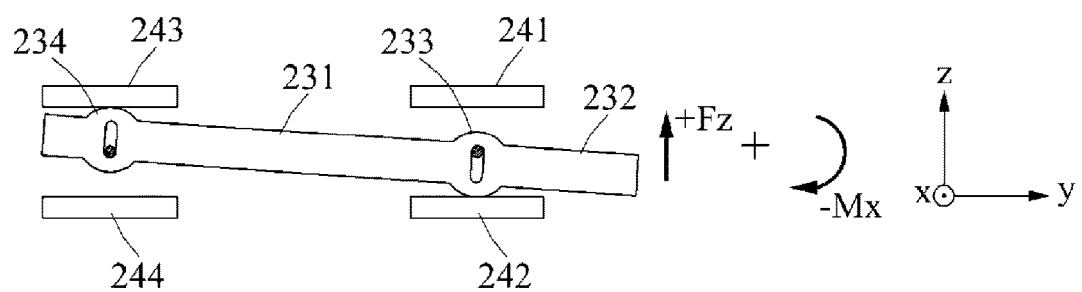

FIG. 5B illustrates an operational state of the sensor module 2 when a force in the positive direction of the z axis and a moment in a clockwise direction of the x axis are simultaneously applied. Referring to FIG. 5B, when a force in the positive direction of the z axis and a moment in the clockwise direction of the x axis are simultaneously applied to the inserting body 23, the inserting body 23 may pressurize the first rear sensor 243 and the second front sensor 242. In this example, due to the force in the positive direction of the z axis, a force sensed by the first rear sensor 243 may be greater than a force sensed by the second front sensor 242. Thus, the sensing board 25 may determine that a force in the positive direction of the z axis and a moment in the clockwise direction of the x axis are applied to the inserting body 23 when forces are sensed by the first rear sensor 243 and the second front sensor 242 and the force sensed by the first rear sensor 243 is greater than the force sensed by the second front sensor 242. In this example, the sensing board 25 may determine, in view of errors in sensors and errors caused by miscellaneous loads, whether a force in the z-axial direction is applied based on whether a difference in magnitude between the force sensed by the first rear sensor 243 and the force sensed by the second front sensor 242 exceeds a set value.

Figure 5C:
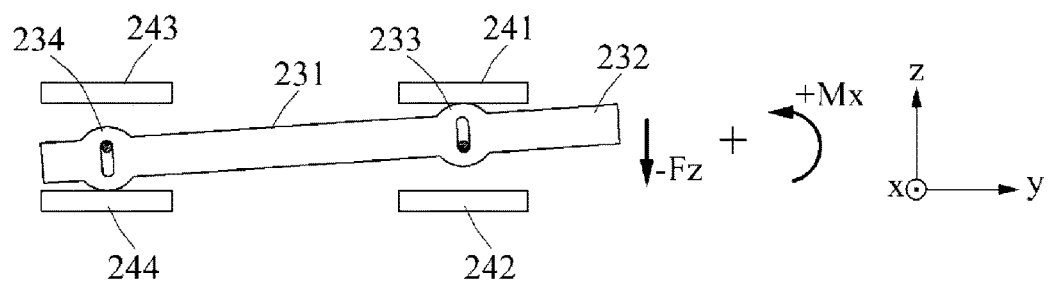

FIG. 5C illustrates an operational state of the sensor module 2 when a force in a negative direction of the z axis and a moment in the counterclockwise direction of the x axis are simultaneously applied. Referring to FIG. 5C, when a force in the negative direction of the z axis and a moment in the counterclockwise direction of the z axis are simultaneously applied to the inserting body 23, the inserting body 23 may pressurize the first front sensor 241 and the second rear sensor 244. In this example, due to the force in the negative direction of the z axis, a force sensed by the first front sensor 241 may be less than a force sensed by the second rear sensor 244. Thus, the sensing board 25 may determine that a force in the negative direction of the z axis and a moment in the counterclockwise direction of the x axis are applied to the inserting body 23 when forces are sensed by the first front sensor 241 and the second rear sensor 244 and the force sensed by the first front sensor 241 is less than the force sensed by the second rear sensor 244. In this example, the sensing board 25 may determine, in view of errors in sensors and errors caused by miscellaneous loads, whether a force in the z-axial direction is applied based on whether a difference in magnitude between the force sensed by the first front sensor 241 and the force sensed by the second rear sensor 244 exceeds a set value.

Figure 5D:
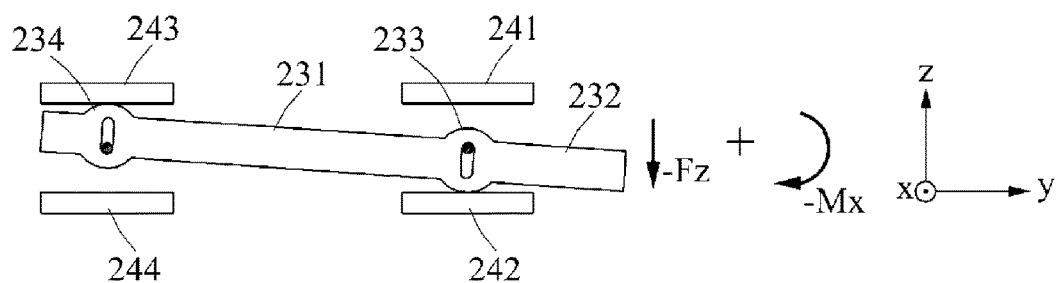

FIG. 5D illustrates an operational state of the sensor module 2 when a force in the negative direction of the z axis and a moment in the clockwise direction of the x axis are simultaneously applied. Referring to FIG. 5D, when a force in the negative direction of the z axis and a moment in the clockwise direction of the x axis are simultaneously applied to the inserting body 23, the inserting body 23 may pressurize the first rear sensor 243 and the second front sensor 242. In this example, due to the force in the negative direction of the z axis, a force sensed by the first rear sensor 243 may be less than a force sensed by the second front sensor 242. Thus, the sensing board 25 may determine that a force in the negative direction of the z axis and a moment in the clockwise direction of the x axis are applied to the inserting body 23 when forces are sensed by the first rear sensor 243 and the second front sensor 242 and the forces sensed by the first rear sensor 243 is less than the force sensed by the second front sensor 242. In this example, the sensing board 25 may determine, in view of errors in sensors and errors caused by miscellaneous loads, whether a force in the z-axial direction is applied based on whether a difference in magnitude between the force sensed by the first rear sensor 243 and the force sensed by the second front sensor 242 exceeds a set value.

In summary, when a force in the z-axial direction and a moment about the x axis are simultaneously applied to the inserting body 23, the sensing board 25 may determine directions of the force and the moment.

Figure 6:
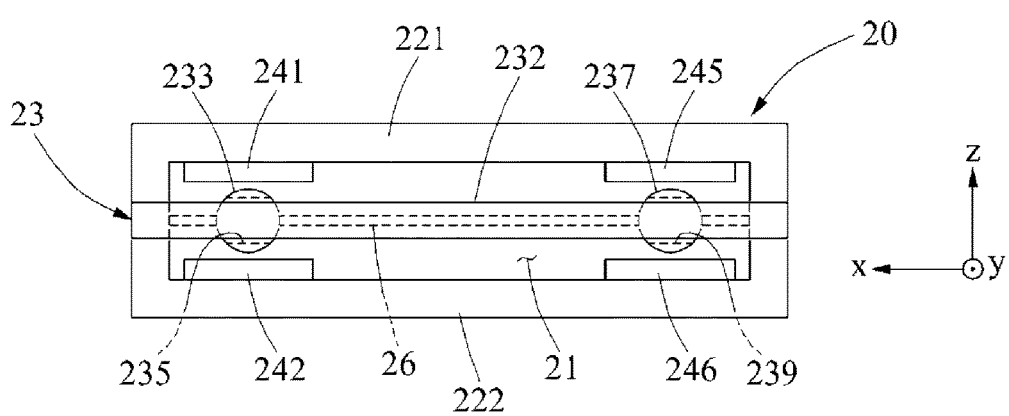
FIG. 6 is a cross-sectional view illustrating a sensor module cut along a plane x-z according to at least one example embodiment.

FIG. 6 is a cross-sectional view illustrating the sensor module 2 cut along a plane x-z according to at least one example embodiment.

Referring to FIG. 6, the sensor module 2 may include the receiving body 20 including the inserting space 21, the inserting body 23, the first sensor 241, the second sensor 242, a fifth sensor 245, a sixth sensor 246, and the separation preventing portion 26.

The first sensor 241 and the fifth sensor 245 disposed above the inserting body 23 may be referred to as a first sensor assembly, and the second sensor 242 and the sixth sensor 246 disposed below the inserting body 23 may be referred to as a second sensor assembly.

The inserting body 23 may include a pressurizing portion to be in contact with the first sensor 241, the second sensor 242, the fifth sensor 245, or the sixth sensor 246.

The pressurizing portion may include a left pressurizing portion 233 disposed on a left side from a center of the inserting body 23, and a right pressurizing portion 237 disposed on a right side from the center of the inserting body 23. The left pressurizing portion 233 and the right pressurizing portion 237 may overlap (or, alternatively, be positioned in the z-axial width direction to correspond to) the first supporting plate 221 and the second supporting plate 222, respectively, in the thickness direction of the inserting body 23, for example, in the z-axial direction.

The inserting body 23 may include a guide slot configured to restrict a moving range of the inserting body 23. The guide slot may elongate in the thickness direction of the inserting body 23. The separation preventing portion 26 may be inserted into the guide slot. For example, the guide slot may be provided at a thickest portion of the inserting body 23. In the foregoing arrangement, by maximizing a length of the guide slot, a sufficient moving distance of the inserting body 23 may be secured. For example, the inserting body 23 may include a left guide slot 235 disposed in the left pressurizing portion 233, and a right guide slot 239 disposed in the right pressurizing portion 237. Meanwhile, the number and positions of the guide slots are not limited thereto. For example, only a single guide slot may be provided at a center of the inserting body 23.

The first sensor 241 may be disposed between an inner surface of the first supporting plate 221 and the left pressurizing portion 233. The first sensor 241 may also be referred to as a first left sensor. The second sensor 242 may be disposed between an inner surface of the second supporting plate 222 and the left pressurizing portion 233. The second sensor 242 may also be referred to as a second left sensor. The fifth sensor 245 may be disposed between the inner surface of the first supporting plate 221 and the right pressurizing portion 237. The fifth sensor 245 may also be referred to as a first right sensor. The sixth sensor 246 may be disposed between the inner surface of the second supporting plate 222 and the right pressurizing portion 237. The sixth sensor 246 may also be referred to as a second right sensor.

In detail, the first sensor assembly may include the first left sensor 241 and the first right sensor 245 which are disposed to be spaced apart from each other in a direction perpendicular to the width direction or the inserting direction of the inserting body 23.

Similarly, the second sensor assembly may include the second left sensor 242 and the second right sensor 246 which are disposed to be spaced apart from each other in the direction perpendicular to the width direction or the inserting direction of the inserting body 23. In further detail, the second sensor assembly may include the second left sensor 242 configured to overlap (or, alternatively, be positioned in the z-axial width direction to correspond to) the first left sensor 241 in the thickness direction of the inserting body 23, and the second right sensor 246 configured to overlap the first right sensor 245 in the thickness direction of the inserting body 23.

FIGS. 7A, 7B, 7C, and 7D are cross-sectional views illustrating operational states of the sensor module 2 when a force or a moment is applied to the sensor module 2 in various directions according to at least one example embodiment.

Figure 7A:
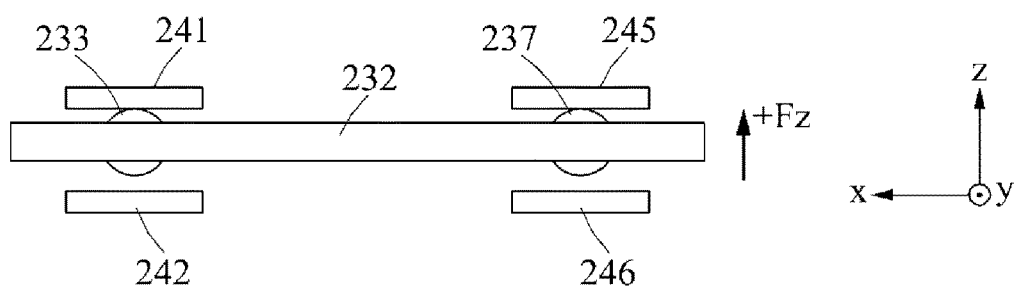
FIGS. 7A, 7B, 7C, and 7D are cross-sectional views illustrating operational states of a sensor module when a force or a moment is applied to the sensor module in various directions according to at least one example embodiment.

In detail, FIG. 7A illustrates an operational state of the sensor module 2 when a force in a positive direction of a z axis is applied. Referring to FIG. 7A, the sensing board 25 may determine that a force in the positive direction of the z axis is applied to the inserting body 23 and a moment about a y axis is not applied to the inserting body 23 when forces of equal magnitudes are sensed by the first left sensor 241 and the first right sensor 245.

Figure 7B:
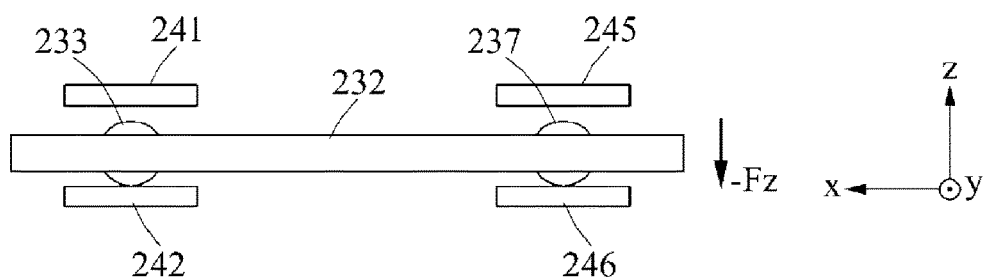

FIG. 7B illustrates an operational state of the sensor module 2 when a force in a negative direction of the z axis is applied. Referring to FIG. 7B, the sensing board 25 may determine that a force in the negative direction of the z axis is applied to the inserting body 23 and a moment about the y axis is not applied to the inserting body 23 when forces of equal magnitudes are sensed by the second left sensor 242 and the second right sensor 246.

Figure 7C:
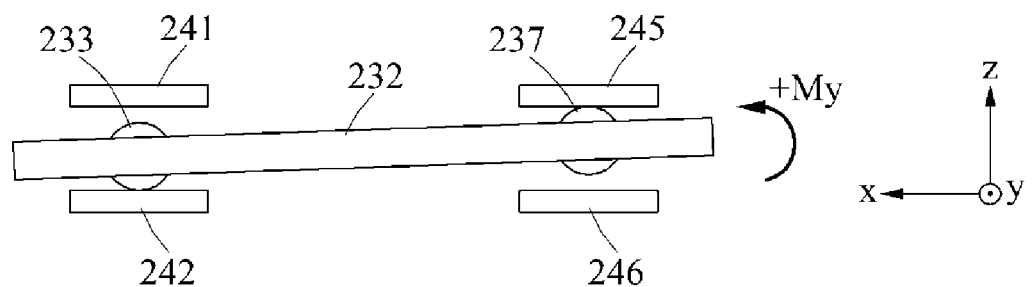

FIG. 7C illustrates an operational state of the sensor module 2 when a moment in a counterclockwise direction of the y axis is applied. Referring to FIG. 7C, the sensing board 25 may determine that a moment in the counterclockwise direction of the y axis is applied to the inserting body 23 and a force in a z-axial direction is not applied to the inserting body 23 when forces of equal magnitudes are sensed by the second left sensor 242 and the first right sensor 245.

Figure 7D:
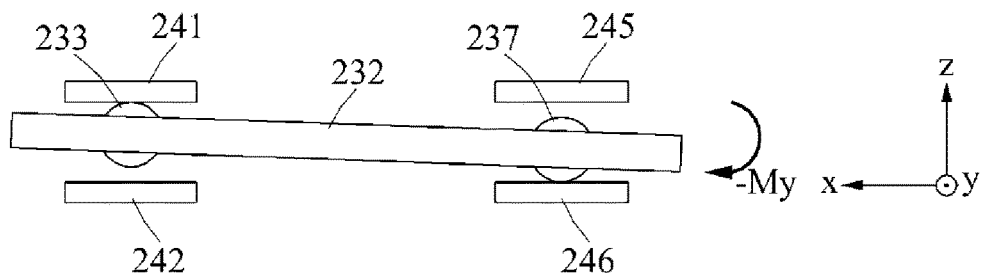

FIG. 7D illustrates an operational state of the sensor module 2 when a moment in a clockwise direction of the y axis is applied. Referring to FIG. 7D, the sensing board 25 may determine that a moment in the clockwise direction of the y axis is applied to the inserting body 23 and a force in the z-axial direction is not applied to the inserting body 23 when forces of equal magnitudes are sensed by the first left sensor 241 and the second right sensor 246.

In summary, the sensing board 25 may determine a direction of a force applied in the thickness direction of the inserting body 23, for example, the z-axial direction, and a direction of a moment applied about an axis corresponding to the length direction of the inserting body 23, for example, a y-axial direction.

FIGS. 8A, 8B, 8C, and 8D are cross-sectional views illustrating operational states of the sensor module 2 when a force and a moment are simultaneously applied to the sensor module 2 in various directions according to at least one example embodiment.

Figure 8A:
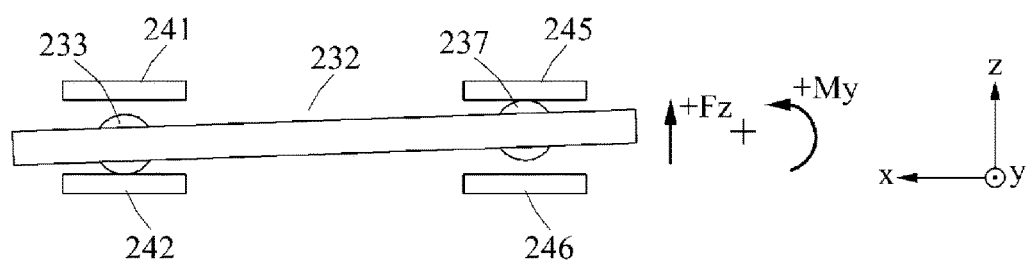
FIGS. 8A, 8B, 8C, and 8D are cross-sectional views illustrating operational states of a sensor module when a force and a moment are simultaneously applied to the sensor module in various directions according to at least one example embodiment.

In detail, FIG. 8A illustrates an operational state of the sensor module 2 when a force in a positive direction of a z axis and a moment in a counterclockwise direction of a y axis are simultaneously applied. Referring to FIG. 8A, the sensing board 25 may determine that a force in the positive direction of the z axis and a moment in the counterclockwise direction of the y axis are applied to the inserting body 23 when forces are sensed by the second left sensor 242 and the first right sensor 245 and the force sensed by the second left sensor 242 is less than the force sensed by the first right sensor 245.

Figure 8B:
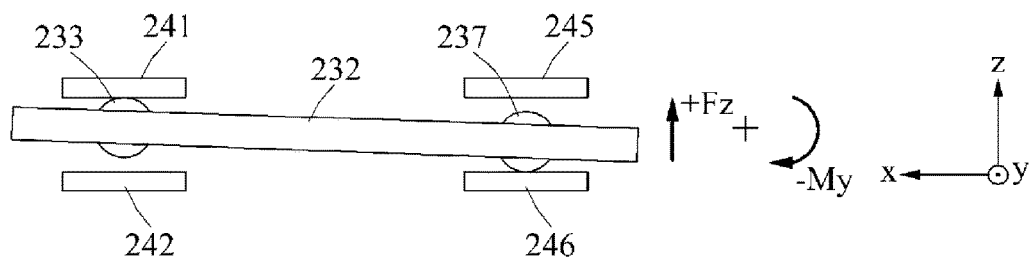

FIG. 8B illustrates an operational state of the sensor module 2 when a force in the positive direction of the z axis and a moment in a clockwise direction of the y axis are simultaneously applied. Referring to FIG. 8B, the sensing board 25 may determine that a force in the positive direction of the z axis and a moment in the clockwise direction of the y axis are applied to the inserting body 23 when forces are sensed by the first left sensor 241 and the second right sensor 246 and the force sensed by the first left sensor 241 is greater than the force sensed by the second right sensor 246.

Figure 8C:
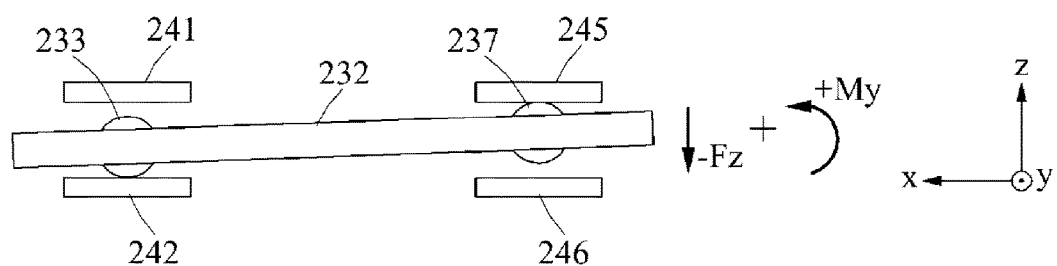

FIG. 8C illustrates an operational state of the sensor module 2 when a force in a negative direction of the z axis and a moment in the counterclockwise direction of the y axis are simultaneously applied. Referring to FIG. 8C, the sensing board 25 may determine that a force in the negative direction of the z axis and a moment in the counterclockwise direction of the y axis are applied to the inserting body 23 when forces are sensed by the second left sensor 242 and the first right sensor 245 and the force sensed by the second left sensor 242 is greater than the force sensed by the first right sensor 245.

Figure 8D:
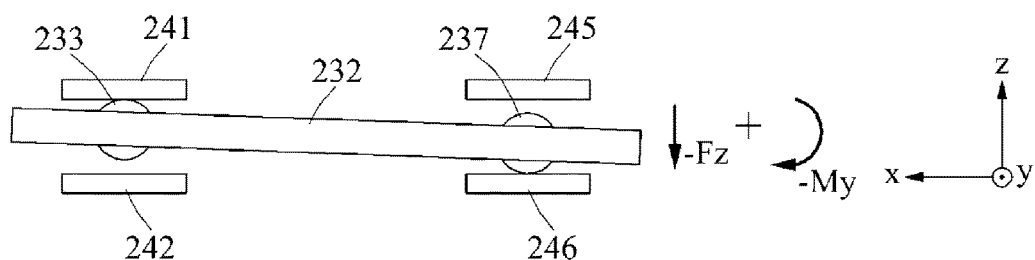

FIG. 8D illustrates an operational state of the sensor module 2 when a force in the negative direction of the z axis and a moment in the clockwise direction of the y axis are simultaneously applied. Referring to FIG. 8D, the sensing board 25 may determine that a force in the negative direction of the z axis and a moment in the clockwise direction of the y axis are applied to the inserting body 23 when forces are sensed by the first left sensor 241 and the second right sensor 246 and the force sensed by the first left sensor 241 is less than the force sensed by the second right sensor 246.

In summary, when a force in the z-axial direction and a moment about the y axis are simultaneously applied to the inserting body 23, the sensing board 25 may determine the directions of the force and the moment.

Summarizing the descriptions provided with reference to FIGS. 1 through 8D, the sensor module 2 may include a first sensor assembly including three first force sensors 241, 243, and 245 which are disposed non-collinearly, and a second sensor assembly including three second force sensors 242, 244, and 246 configured to overlap (or, alternatively, be positioned in the z-axial width direction to correspond to) the three first force sensors 241, 243, and 245, respectively. In the foregoing structure, the sensing board 25 may determine a direction of a force applied in the thickness direction of the inserting body 23, for example, the z-axial direction, and directions of two moments applied about an axis corresponding to the width direction of the inserting body, for example, the x-axial direction, and an axis corresponding to the length direction of the inserting body 23, for example, the y-axial direction.

Meanwhile, the descriptions are provided under an assumption that a force or a moment is applied to the inserting body 23. However, the same descriptions may be applicable to a case in which a force or a moment is applied to the receiving body 20.

Figure 9:
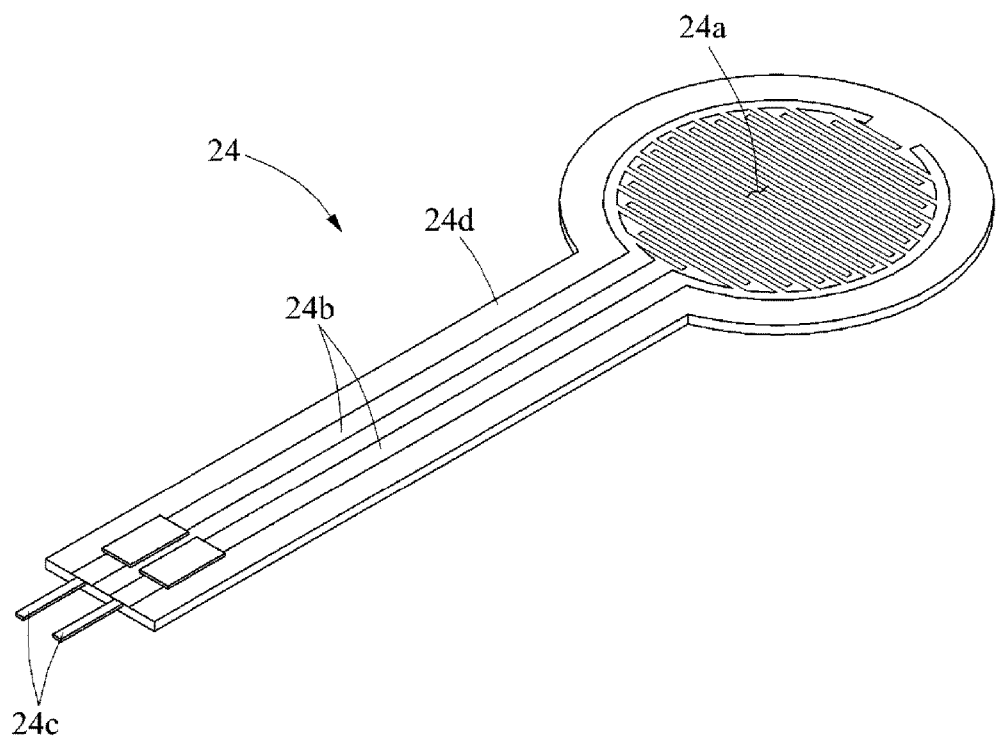
FIG. 9 is a perspective view illustrating a sensor according to at least one example embodiment.
Figure 10:
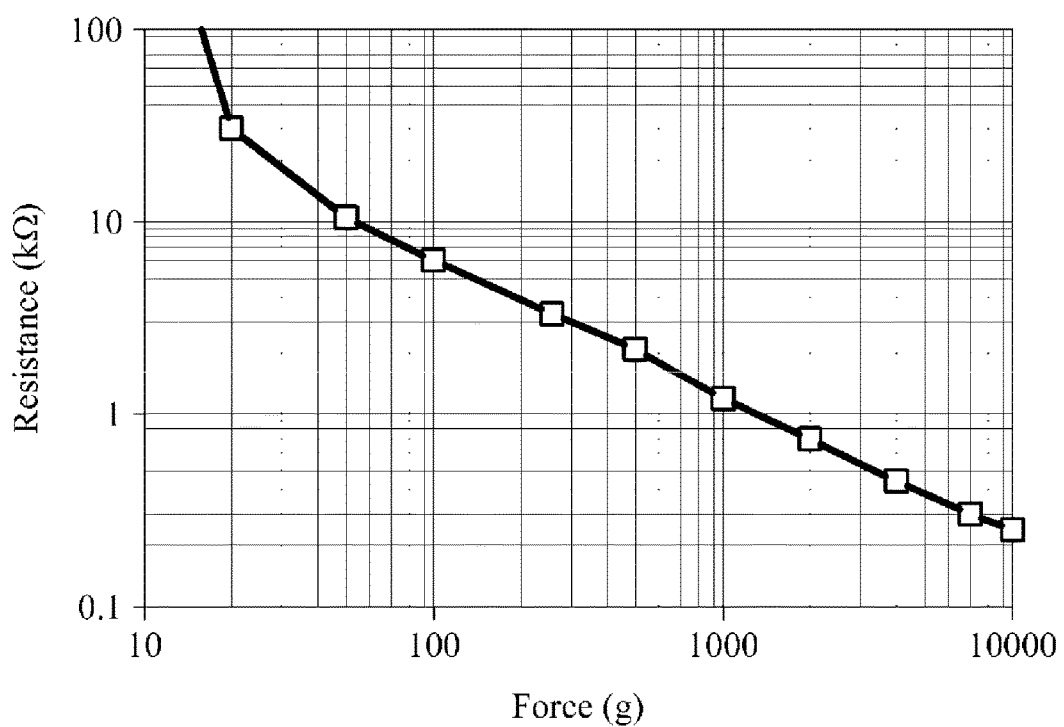
FIG. 10 is a graph illustrating a resistance which changes in response to a force applied to a sensor according to at least one example embodiment.
Figure 11:
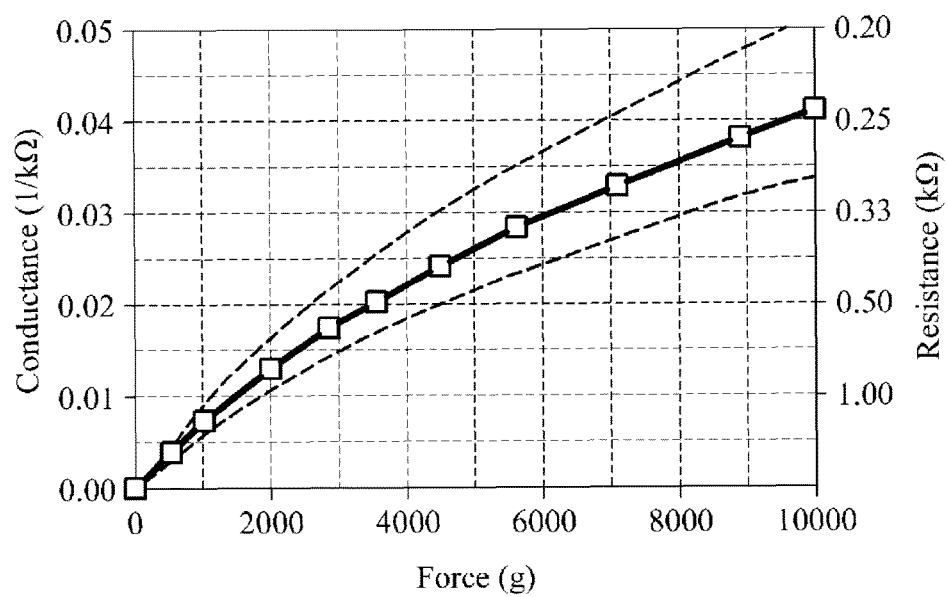
FIG. 11 is a graph illustrating a conductance which changes in response to a force applied to a sensor according to at least one example embodiment.

FIG. 9 is a perspective view illustrating a sensor according to at least one example embodiment, FIG. 10 is a graph illustrating a resistance which changes in response to a force applied to the sensor according to at least one example embodiment, and FIG. 11 is a graph illustrating a conductance which changes in response to a force applied to the sensor according to at least one example embodiment.

Referring to FIGS. 9 through 11, the sensor 24 may be a force sensitive resistance (FSR) sensor. For example, the FSR sensor 24 may include a sensing plate 24a configured to be installed between the inserting body 23 and the receiving body 20, a connecting line 24b connected to the sensing plate 24a, a flexible plate 24d configured to enclose the sensing plate 24a and the connecting line 24b, and a connecting terminal 24c connected to the connecting line 24b and exposed to an external portion of the flexible plate 24d. The FSR sensor 24 may measure a vertical force and have flexibility. Further, the FSR sensor 24 may not require a separate voluminous and heavy electronic component such as, for example, a force/torque sensor or an amplifier and thus, the overall volume and weight of a product may be reduced.

As shown in FIG. 10, a resistance of the FSR sensor 24 may decrease with an increase in an applied force. FIG. 10 is a log scale graph, and the FSR sensor 24 shows a resistance close to infinity when a force is not applied.

As shown in FIG. 11, a conductance of the FSR sensor 24 corresponds to "0" when a force is "0". In FIG. 11, an average of the conductance of the FSR sensor 24 is indicated using a solid line, and a margin of error of the conductance of the FSR sensor 24 is indicated using broken lines. As learned from FIG. 11, the FSR sensor 24 has a characteristic of showing a resistance close to infinity when a force is not applied and thus, the accuracy may increase toward a point at which the force is "0". Accordingly, by disposing FSR sensors to which a pre-load is not applied on both sides of the inserting body, and setting a state in which the force is "0" as a reference point, the reference point may be restored with high reliability although a process of providing a force to the inserting body or the receiving body or eliminating the force from the inserting body or the receiving body is performed iteratively.

In a conventional force sensor, an elastic deformation of the inserting body or the receiving body may be measured, and, therefore, an error caused by a plastic deformation of the inserting body or the receiving body may occur. In contrast, in one or more example embodiments, when a force applied to the FSR sensor 24 is measured, an effect of such a plastic deformation may be ignored. In detail, by disposing FSR sensors to which a pre-load is not applied on both sides of the inserting body, and setting a state in which the force is "0" as a reference point, a direction in which a force is applied relative to the reference point may be verified with high reliability.

Figure 12:
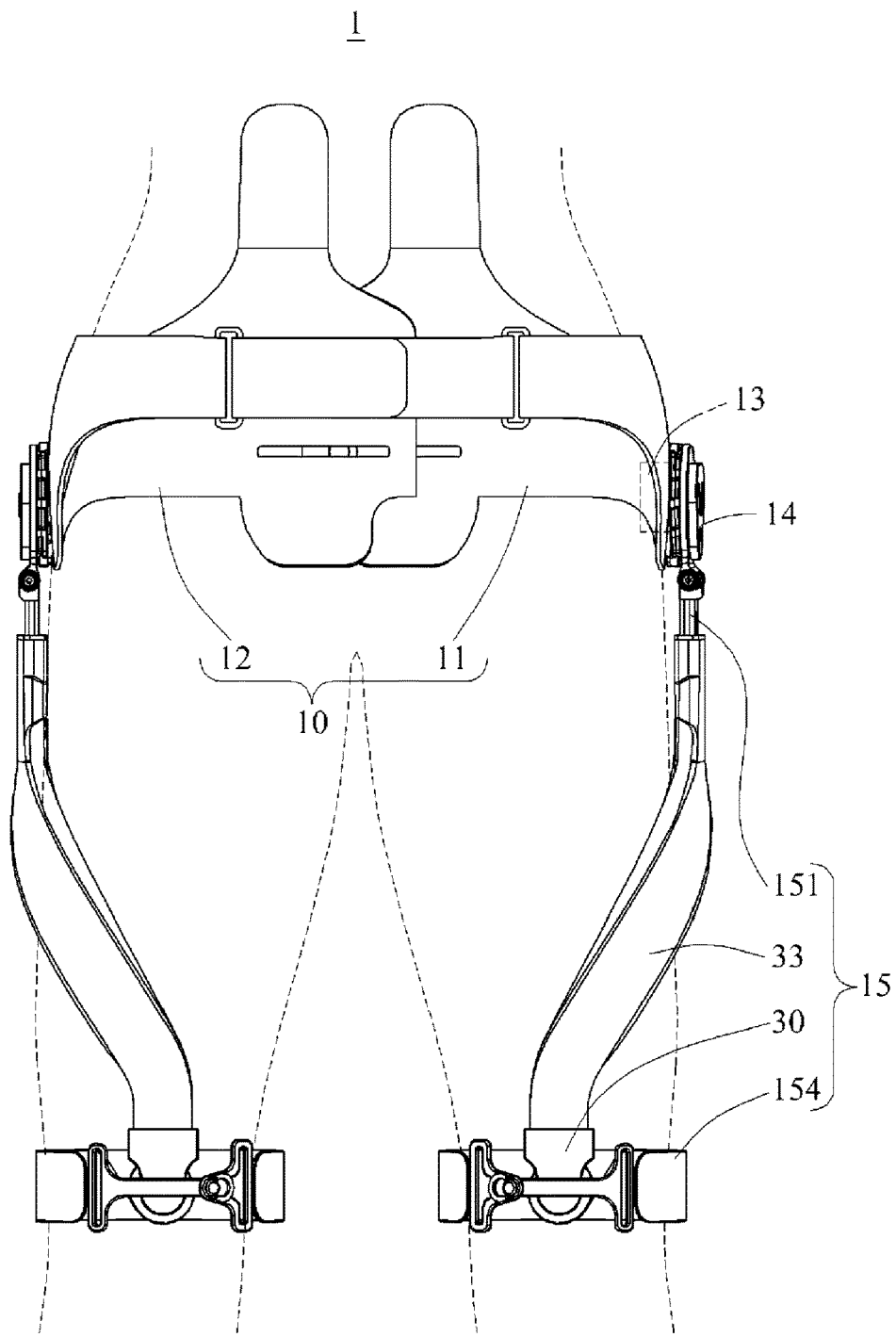
FIG. 12 is a front view illustrating a motion assistance apparatus according to at least one example embodiment.
Figure 13:
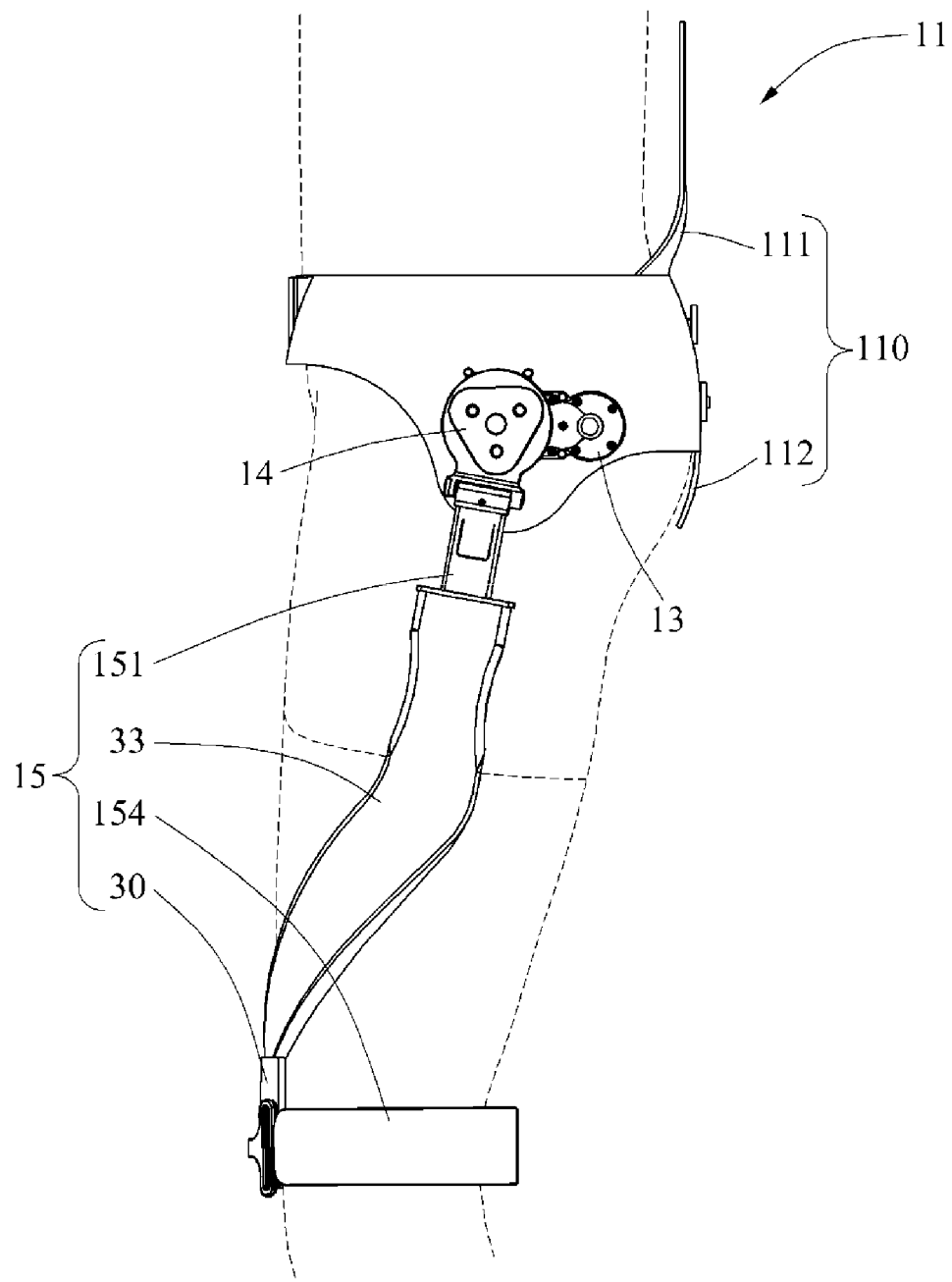
FIG. 13 is a side view illustrating a motion assistance apparatus according to at least one example embodiment.

FIG. 12 is a front view illustrating a motion assistance apparatus according to at least one example embodiment, and FIG. 13 is a side view illustrating the motion assistance apparatus 1 according to at least one example embodiment.

Referring to FIGS. 12 and 13, a motion assistance apparatus 1 may be worn by a user to assist a motion of the user.

The user may correspond to a human, an animal, or a robot. However, the user is not limited thereto. In addition, although FIG. 12 illustrates a case in which the motion assistance apparatus 1 assists motions of thighs of the user, the motion assistance apparatus 1 may also assist a motion of an upper body, for example, a hand, an upper arm, and a lower arm of the user. Further, the motion assistance apparatus 1 may assist a motion of another part of a lower body, for example, a foot, and a calf of the user. The motion assistance apparatus 1 may assist a motion of a part of the user. Hereinafter, a case in which the motion assistance apparatus 1 assists motions of thighs of a human will be described. However, example embodiments are not limited thereto.

The motion assistance apparatus 1 may include a fixing module 10, a driving module 13, a rotary joint 14, and a supporting module 15.

The fixing module 10 may be attached to the user, and may cover an outer surface of the user. For example, the fixing module 10 may be attached to one side of a waist of the user, and may include a curved surface corresponding to a contact portion of the user. The fixing module 10 may include a first side frame 11 disposed on one side of the user, and a second side frame 12 disposed on another side of the user. The first side frame 11 and the second side frame 12 may be detachable from each other. A distance between the first side frame 11 and the second side frame 12 may be adjusted to be suitable for a body condition of the user.

The first side frame 11 may include a first supporting member 110 configured to support one side of the user. The first supporting member 110 may include a first upper supporting member 111 configured to support an upper side of the user, and a first lower supporting member 112 configured to support a lower side of the user. Similar to the first side frame 11, the second side frame 12 may include a second upper supporting member and a second lower supporting member.

The driving module 13 may provide a power to be transmitted to the rotary joint 14. For example, the driving module 13 may be disposed in a lateral direction of the rotary joint 14, in detail, such that a rotation axis of the driving module 13 may be spaced apart from a rotation axis of the rotary joint 14. In this example, when compared to a case in which the driving module 13 and the rotary joint 14 share a rotation axis, a protruding height from the user may relatively decrease. Dissimilar to the drawings, the driving module 13 may be disposed to be spaced apart from the rotary joint 14 much more. In this example, a power transmitting module may be additionally provided to transmit power from the driving module 13 to the rotary joint 14. The power transmitting module may be a rotary body such as, for example, a gear, or a longitudinal member such as, for example, a wire, a cable, a string, a rubber band, a spring, a belt, and a chain.

The rotary joint 14 may rotate using a power received from the driving module 13. The rotary joint 14 may assist a motion of a joint portion of the user. The rotary joint 14 may be disposed on one side of the fixing module 10 at a position corresponding to the joint portion of the user. For example, the rotary joint 14 may be disposed on one side of a hip joint of the user. One side of the rotary joint 14 may be connected to the driving module 13, and another side of the rotary joint 14 may be connected to the supporting module 15.

The supporting module 15 may support a portion of the user, and assist a motion of the portion of the user. The supporting module 15 configured to rotate using torque of the rotary joint 14 may include a hinge connection structure, thereby being coupled to the rotary joint 14. In this example, by a hinge axis of the hinge connection structure and a rotation axis of the rotary joint 14, the supporting module 15 may perform a two degree of freedom (DOF) motion relative to the fixing module 10. The supporting module 15 may include a sliding joint 151, a supporting frame 152, an applying member 30, and a supporting band 154.

The sliding joint 151 may connect the rotary joint 14 to a force transmitting frame 33, and rotate using a torque of the rotary joint 14. The sliding joint 151 may be provided to slide along the force transmitting frame 33.

The force transmitting frame 33 may transmit a force to a portion of the user. One end portion of the force transmitting frame 33 may be rotatably connected to the sliding joint 151, and another end portion of the force transmitting frame 33 may be connected to the supporting band 154 to transmit a force to a portion of the user. For example, the force transmitting frame 33 may push or pull the thigh of the user. The force transmitting frame 33 may extend in a length direction of the thigh of the user, and be bent to enclose a portion of a circumference of the thigh of the user. The one end portion of the force transmitting frame 33 may be disposed on a side surface of the thigh of the user, and the other end portion of the force transmitting frame 33 may be disposed on a front surface of the thigh of the user. In detail, a surface on the side of the one end portion of the force transmitting frame 33 may be orthogonal to a surface on the side of the other end portion of the force transmitting frame 33.

The applying member 30 may be connected to the other end portion of the force transmitting frame 33 to apply force to a portion of the user. For example, the applying member 30 may be disposed along the front surface of the thigh of the user, or in a circumferential direction of the thigh of the user to push or pull the thigh of the user. The applying member 30 may include a curved surface corresponding to the thigh of the user, and configured to extend from the other end portion of the force transmitting frame 33 toward both sides of the force transmitting frame 33.

The supporting band 154 may be connected to one side of the applying member 30. For example, the supporting band 154 may be disposed to enclose a circumference of at least a portion of the thigh of the user, thereby preventing a separation of the thigh of the user from the force transmitting frame 33.

Meanwhile, a driving module and/or a supporting module may be additionally provided. For example, the supporting module 15 may extend to a knee, and an additional rotary joint may be provided in the supporting module 15 at a position corresponding to a knee joint. Further, an additional supporting module may be connected to the additional rotary joint. The additional supporting module may support a calf of the user, thereby assisting a motion of the calf of the user. Here, a driving module configured to drive the additional rotary joint may be disposed on one side of the additional rotary joint, or may be disposed in, for example, the fixing module 10 to be spaced apart from the additional rotary joint.

Figure 14:
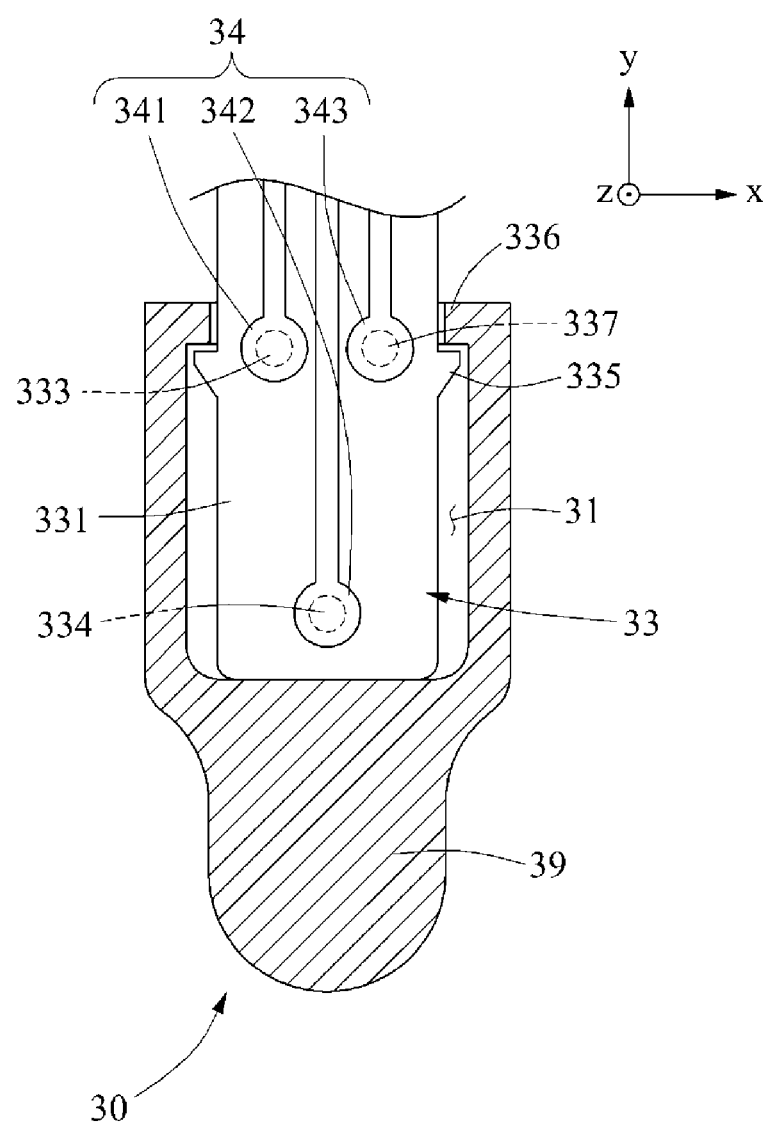
FIG. 14 is a cross-sectional view illustrating an applying member cut along a plane x-y according to at least one example embodiment.

FIG. 14 is a cross-sectional view illustrating the applying member 30 cut along a plane x-y according to at least one example embodiment.

Referring to FIG. 14, the applying member 30 may include an inserting space 31 into which the force transmitting frame 33 is to be inserted. The applying member 30 and the force transmitting frame 33 may correspond to the receiving body 20 and the inserting body 23, respectively. A plurality of sensors 34 may be disposed between the applying member 30 and the force transmitting frame 33.

For example, the plurality of sensors 34 may include a first sensor 341, a second sensor 342, and a third sensor 343. The first sensor 341 and the second sensor 342 may be disposed to be spaced apart from each other in a length direction of the force transmitting frame 33, for example, a y-axial direction. The first sensor 341 and the third sensor 343 may be disposed to be spaced apart from each other in a width direction of the force transmitting frame 33, for example, an x-axial direction. The first sensor 341, the second sensor 342, and the third sensor 343 may be disposed non-collinearly. Meanwhile, relative to the force transmitting frame 33, a fourth sensor, a fifth sensor, and a sixth sensor which overlap the first sensor 341, the second sensor 342, and the third sensor 343, respectively, may be disposed on opposite sides of the first sensor 341, the second sensor 342, and the third sensor 343.

The applying member 30 and the force transmitting frame 33 may include a first separation preventing portion 336 and a second separation preventing portion 335, respectively, to prevent a separation between the applying member 30 and the force transmitting frame 33. The first separation preventing portion 336 and the second separation preventing portion 335 may be, for example, protrusions which protrude toward respective counterparts. The first separation preventing portion 336 and the second separation preventing portion 335 may enable the force transmitting frame 33 to move or rotate within a desired (or, alternatively a predetermined) range while not being separated from the applying member 30.

The applying member 30 may further include an end portion 39 configured to be inserted into the supporting band 154.

In the foregoing structure, a force or a moment applied by the force transmitting frame 33 to a thigh of a user may be measured. In detail, a direction of a force in a z-axial direction, and directions of moments about an x axis and a y axis may be measured.

Figure 15:
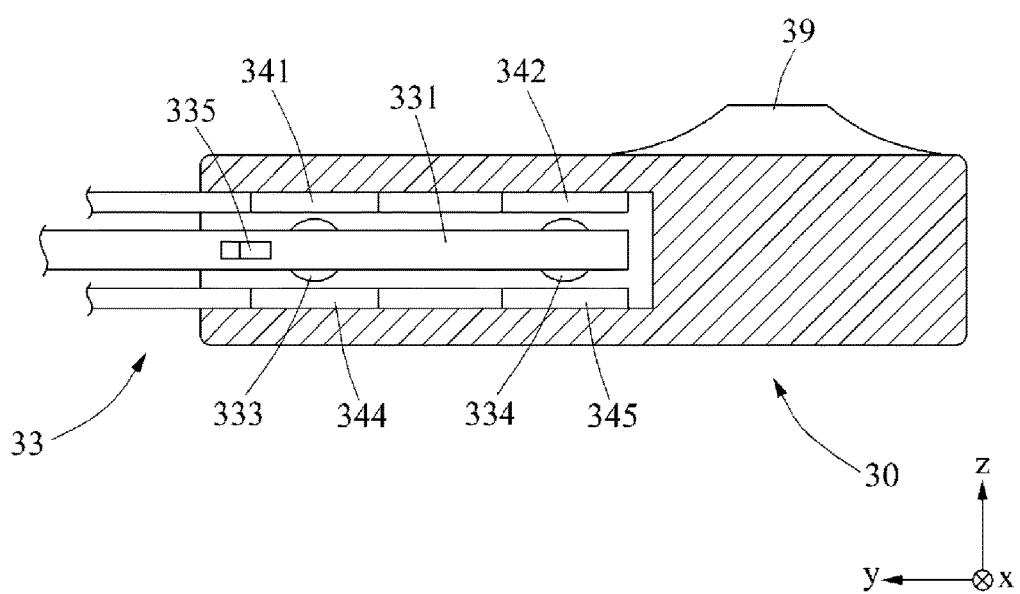
FIG. 15 is a cross-sectional view illustrating an applying member cut long a plane y-z according to at least one example embodiment.

FIG. 15 is a cross-sectional view illustrating the applying member 30 cut long a plane y-z according to at least one example embodiment.

Referring to FIG. 15, the first sensor 341 and the second sensor 342 disposed above the force transmitting frame 33 may be referred to as a first sensor assembly, and a fourth sensor 344 and a fifth sensor 345 disposed below the force transmitting frame 33 may be referred to as a second sensor assembly. Depending on positions, the first sensor 341 may be referred to as a first front sensor, and the second sensor 342 may be referred to as a first rear sensor. Similarly, the fourth sensor 344 may be referred to as a second front sensor, and the fifth sensor 345 may be referred to as a second rear sensor.

The force transmitting frame 33 may include an inserting plate 331, and a pressurizing portion to be in contact with the first sensor 341, the second sensor 342, the fourth sensor 344, or the fifth sensor 345. The pressurizing portion may include a front pressurizing portion 333 which is close to an exposed portion of the inserting plate 331, and a rear pressurizing portion 334 which is distant from the exposed portion of the inserting plate 331.

In the foregoing structure, similar to the descriptions provided with reference to FIGS. 4A through 5D, a direction of a force applied in a thickness direction of the applying member 30, for example, a z-axial direction, and a direction of a moment applied about an axis corresponding to a width direction of the applying member 30, for example, an x-axial direction, may be determined.

Figure 16:
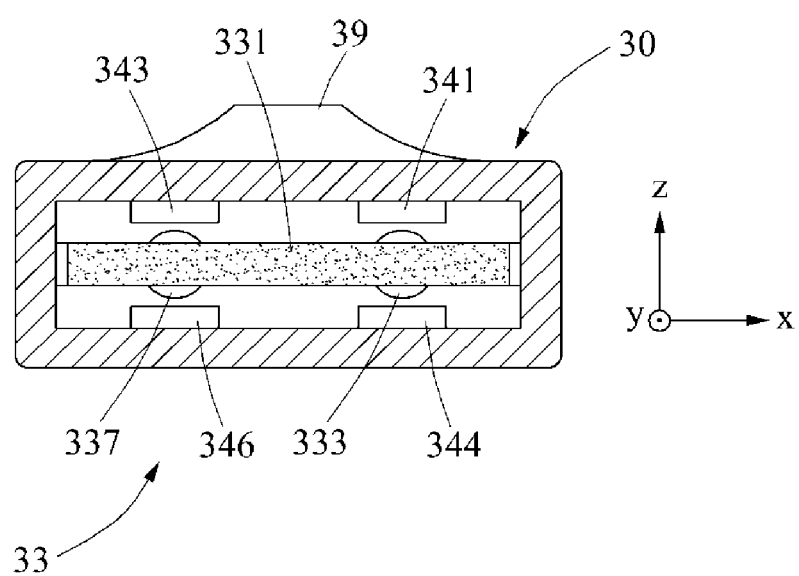
FIG. 16 is a cross-sectional view illustrating an applying member and a force transmitting frame cut along a plane x-z according to at least one example embodiment.

FIG. 16 is a cross-sectional view illustrating the applying member 30 and the force transmitting frame 33 cut along a plane x-z according to at least one example embodiment.

Referring to FIG. 16, the third sensor 343 and the first sensor 341 disposed above the force transmitting frame 33 may be referred to as a first sensor assembly, and a sixth sensor 346 and the fourth sensor 344 disposed below the force transmitting frame 33 may be referred to as a second sensor assembly. Depending on positions, the third sensor 343 may be referred to as a first left sensor, and the first sensor 341 may be referred to as a first right sensor. Similarly, the sixth sensor 346 may be referred to as a second left sensor, and the fourth sensor 344 may be referred to as a second right sensor.

The force transmitting frame 33 may include the inserting plate 331, and a pressurizing portion to be in contact with the first sensor 341, the third sensor 343, the fourth sensor 344, or the sixth sensor 346. The pressurizing portion may include a left pressurizing portion 337 configured to overlap the third sensor 343 and the sixth sensor 346, and a right pressurizing portion 333 configured to overlap the first sensor 341 and the fourth sensor 344.

In the foregoing structure, similar to the descriptions provided with reference to FIGS. 7A through 8D, a direction of a force applied in a thickness direction of the applying member 30, for example, a z-axial direction, and a direction of a moment applied about an axis corresponding to a length direction of the applying member 30, for example, a y-axial direction, may be determined.

Summarizing the descriptions provided with reference to FIGS. 15 and 16, a motion assistance apparatus according to at least one example embodiment may include a first sensor assembly including three first force sensors 341, 342, and 343 which are disposed non-collinearly, and a second sensor assembly including three second force sensors 344, 345, and 346 configured to overlap (or, alternatively, be positioned in the z-axial width direction to correspond to) the three first force sensors 341, 342, and 343, respectively. In the foregoing structure, a sensing board may determine a direction of a force applied in the thickness direction of the applying member 30, for example, the z-axial direction, and directions of two moments applied about an axis corresponding to the width direction of the applying member 30, for example, the x-axial direction, and an axis corresponding to the length direction of the applying member 30, for example, the y-axial direction.

A case in which a force transmitting frame and an applying member apply a force to a thigh of a user has been described above. However, the force transmitting frame and the applying member may also apply a force to another part of the user. For example, the force transmitting frame and the applying member may apply a force to a calf of the user. In this example, one end of the force transmitting frame may be connected to a joint corresponding to a knee joint of the user, and another end of the force transmitting frame may be connected to the applying member which applies a force to the calf of the user. In another example, the force transmitting frame and the applying member may apply a force to a foot of the user. In this example, one end of the force transmitting frame may be connected to a joint corresponding to an ankle joint of the user, and another end of the force transmitting frame may be connected to the applying member which applies a force to the foot of the user.

Figure 17:
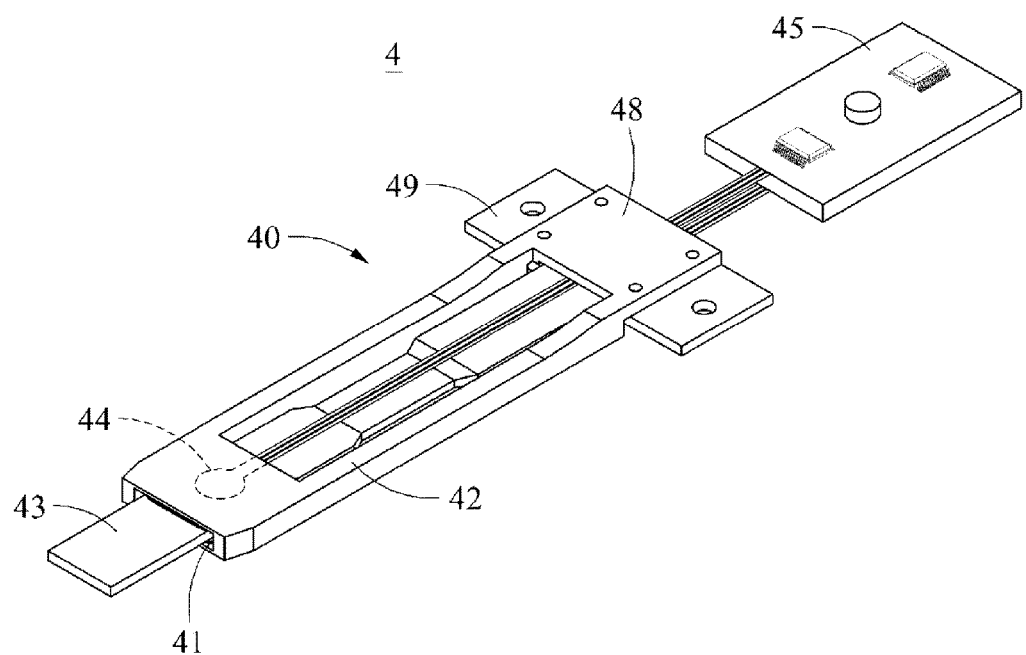
FIG. 17 is a perspective view illustrating a sensor module according to at least one example embodiment.
Figure 18:
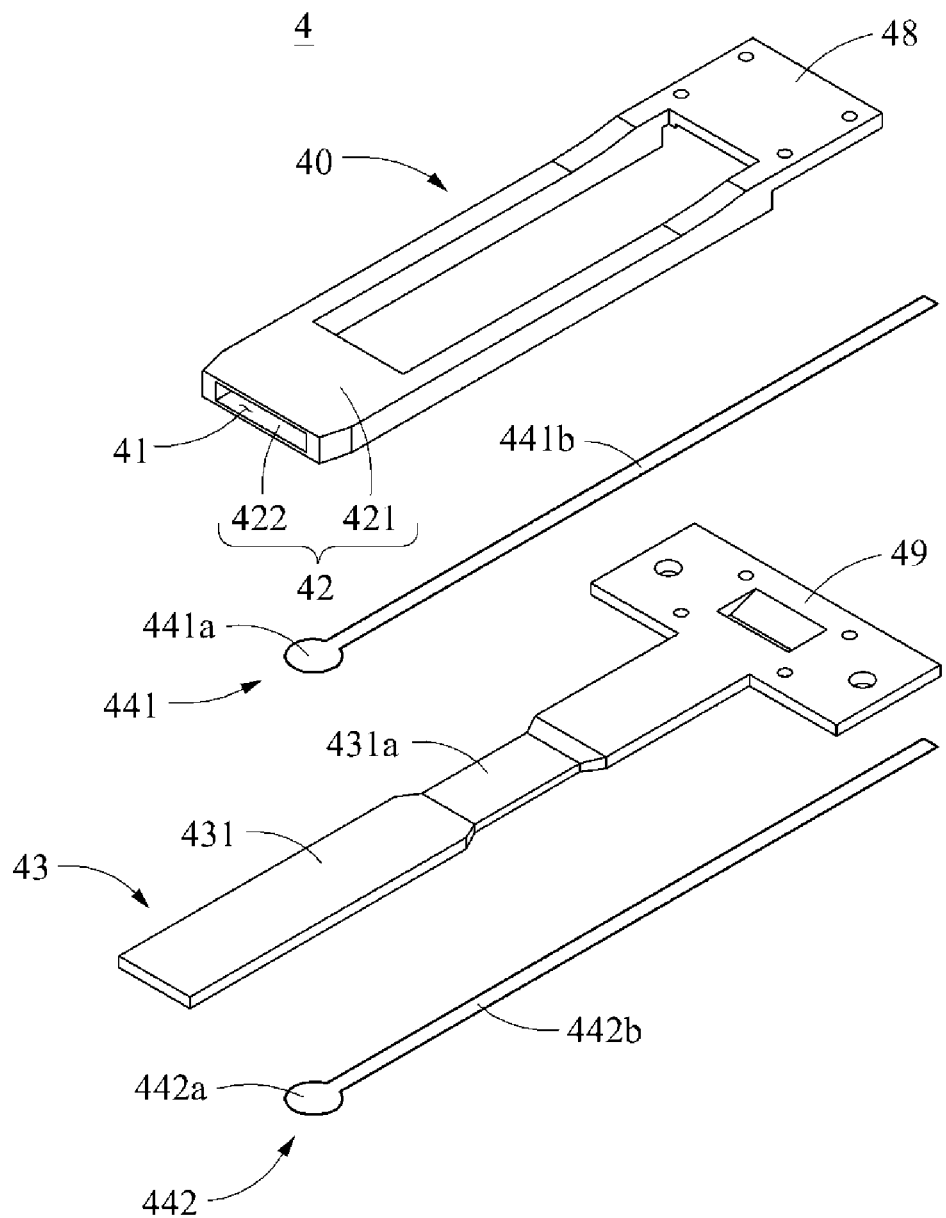
FIG. 18 is an exploded perspective view illustrating a sensor module according to at least one example embodiment.

FIG. 17 is a perspective view illustrating a sensor module 4 according to at least one example embodiment, and FIG. 18 is an exploded perspective view illustrating the sensor module 4 according to at least one example embodiment.

Referring to FIGS. 17 and 18, the sensor module 4 may include a receiving body 40 including an inserting space 41, an inserting body 43 to be disposed in the inserting space 41, an upper sensor 441 including an upper sensing plate 441a and an upper sensor connecting line 441b, a lower sensor 442 including a lower sensing plate 442a and a lower sensor connecting line 442b, and a sensing board 45 connected to the upper sensor connecting line 441b and the lower sensor connecting line 442b.

The receiving body 40 may include an upper supporting plate 421 disposed above the inserting body 43, a lower supporting plate 422 disposed below the inserting body 43, and a first connecting portion 48 to be connected to the inserting body 43.

The inserting body 43 may include an inserting plate 431 to be disposed in the inserting space 41, and a second connecting portion 49 to be connected to the first connecting portion 48.

The inserting plate 431 may include a cross-sectional area reduced portion 431a having a smaller cross-sectional area than a remaining portion. The cross-sectional area reduced portion 431a may be disposed on an opposite side of a portion to which an external force is applied, relative to a portion which overlaps the upper and lower sensing plates 441a and 442a in the inserting plate 431. In the foregoing arrangement, a degree of deformation of the inserting plate 431 by the external force may increase and thus, a sensitivity of the sensor module 4 may improve. In detail, the cross-sectional area reduced portion 431a may be disposed between the second connecting portion 49 and the portion which overlaps the upper and lower sensing plates 441a and 442a in the inserting plate 431.

The second connecting portion 49 may be connected to the first connecting portion 48. In detail, the inserting body 43 may be connected to the receiving body 40. In more detail, the inserting body 43 may have a shape of a cantilever of which one end is a free end and another end is a fixed end. The inserting body 43 and the receiving body 40 may be formed as an integral body. The foregoing shape may prevent a separation of the inserting body 43 from the receiving body 40, without using a separate guide device of the inserting body 43.

Figure 19:
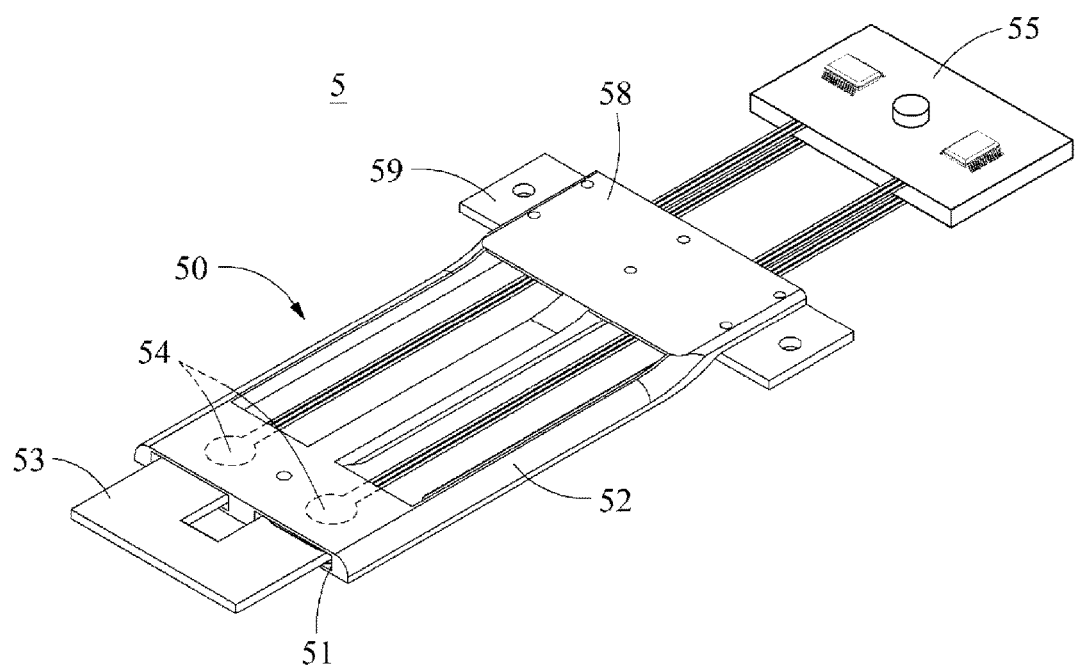
FIG. 19 is a perspective view illustrating a sensor module according to at least one example embodiment.

FIG. 19 is a perspective view illustrating a sensor module 5 according to at least one example embodiment.

Referring to FIG. 19, the sensor module 5 may include an inserting space 51, a receiving body 50 including a supporting plate 52 and a first connecting portion 58, an inserting body 53 to be disposed in the inserting space 51 and including a second connecting portion 59, sensors 54 disposed between the inserting body 53 and the receiving body 50, and a sensing board 55 connected to the sensors 54.

Figure 20:
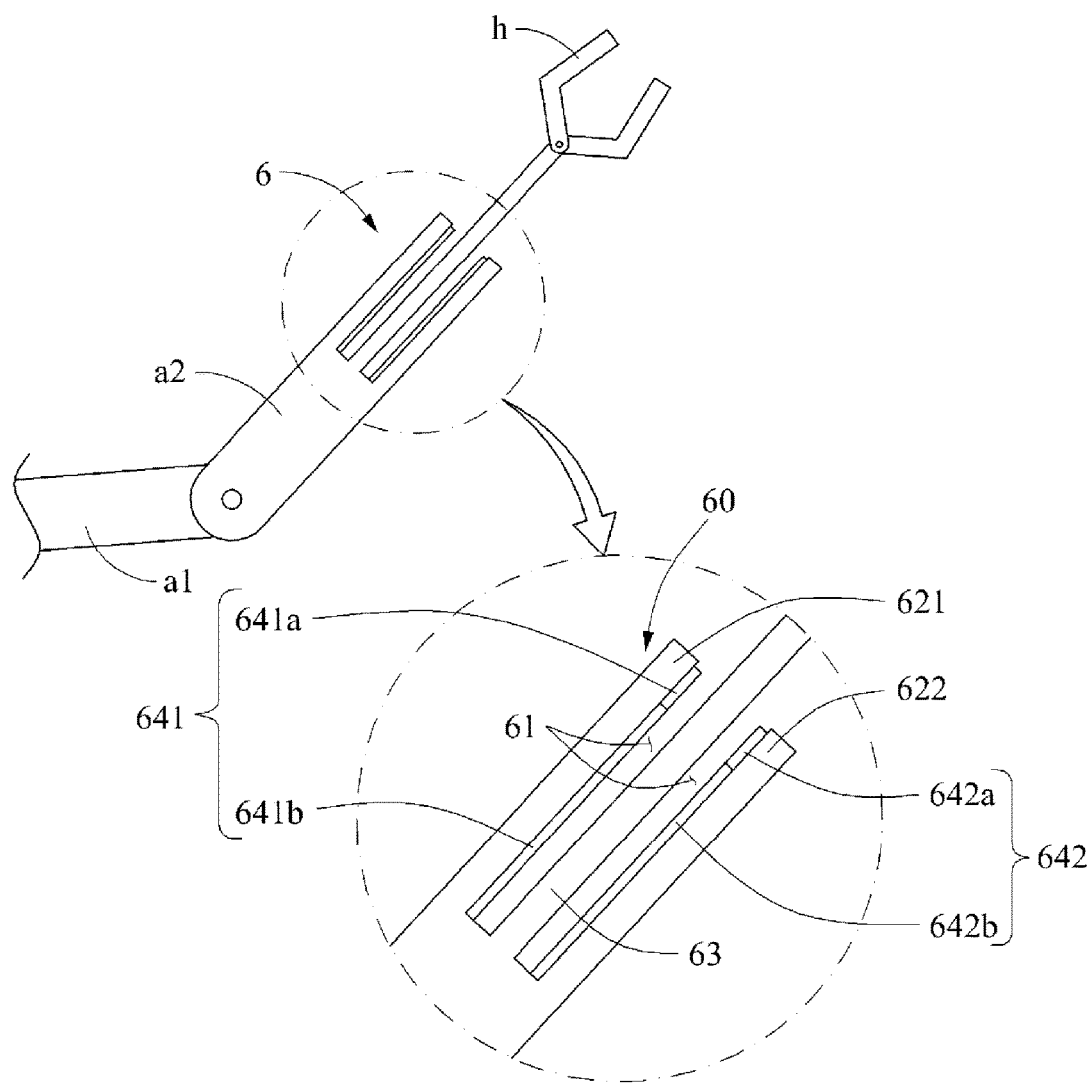
FIG. 20 is a view illustrating a sensor module and a robot arm including the same according to at least one example embodiment.

FIG. 20 is a view illustrating a sensor module 6 and a robot arm including the same according to at least one example embodiment.

Referring to FIG. 20, the robot arm may include a first arm a1, a second arm a2 configured to move relative to the first arm a1, and a hand portion h connected to the second arm a2. At least one of the first arm a1, the second arm a2, and the hand portion h may include the sensor module 6 connected to another one which is adjacent thereto. Hereinafter, a case which the second arm a2 includes the sensor module 6 which is connected to the hand portion h will be described.

The sensor module 6 may include a receiving body 60, an inserting body 63, a first sensor 641, and a second sensor 642. One of the receiving body 60 and the inserting body 63 may be connected to the hand portion h, and the other of the receiving body 60 and the inserting body 63 may be connected to the one of the receiving body 60 and the inserting body 63. Hereinafter, a case in which the inserting body 63 is connected to the hand portion h, and the receiving body 60 is connected to the inserting body 63 will be described.

The receiving body 60 may include a first supporting plate 621 and a second supporting plate 622 which are spaced apart from each other, and a space formed between the first supporting plate 621 and the second supporting plate 622 may be defined as an inserting space 61.

The inserting body 63 may be connected to the hand portion h and disposed in the inserting space 61. For example, one end of the inserting body 63 is connected to the hand portion h, and another end portion of the inserting body 63 may be connected to an inner wall of the inserting space 61.

The first sensor 641 may be disposed between the inserting body 63 and the first supporting plate 621, and include a first sensing plate 641a and a first sensor connecting line 641b.

The second sensor 642 may be disposed between the inserting body 63 and the second supporting plate 622, and include a second sensing plate 642a and a second sensor connecting line 642b.

In the foregoing structure, information about an external force applied to the second arm a2 through the hand portion h may be sensed. As described above, the sensor module 6 may be provided in arms of various robots such as, for example, a manipulator, a rehabilitation device, a social robot, a reconnaissance robot, and an industrial robot. Information about an external force applied to an arm may be sensed by the sensor module 6.

Figure 21:
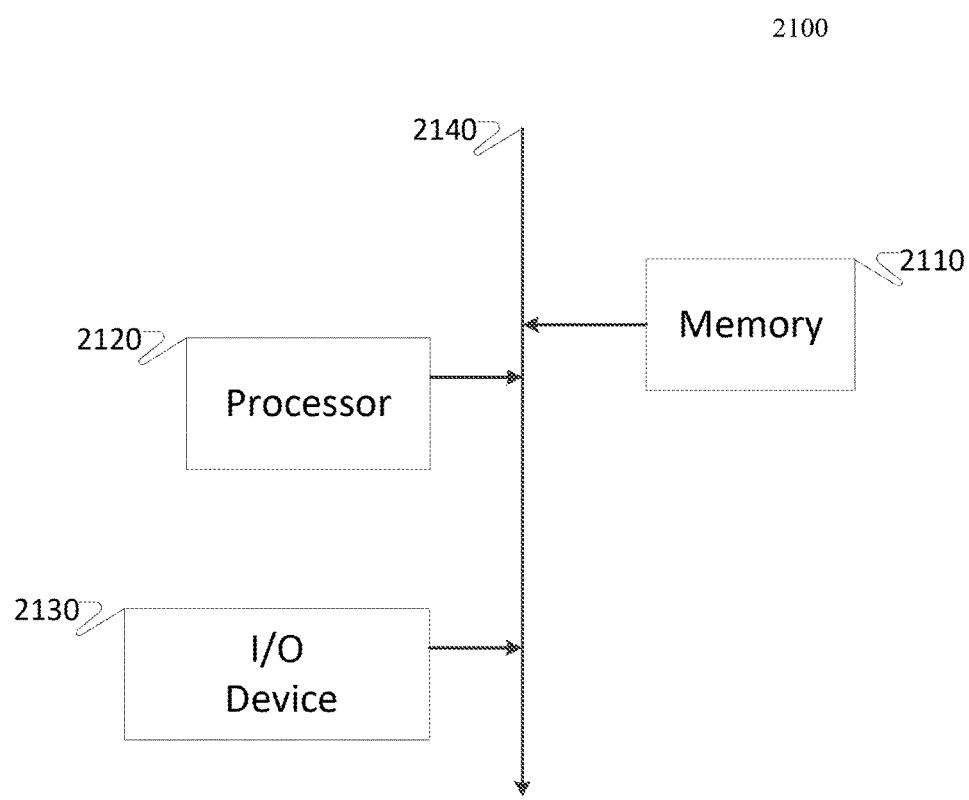
FIG. 21 illustrates a controller according to at least one example embodiment.

FIG. 21 illustrates a controller according to at least one example embodiment.

Referring to FIGS. 1, 14 and 21, the sensors 34 may be connected to a controller 2100.

The controller 2100 may include a memory 2110, a processor 2120 an input/output (I/O) device 2130 and a bus 2140 connecting same. The controller 2100 may be mounted on, for example, the sensing board 25.

The I/O device 2130 may include transmitters and/or receivers. The transmitters may include hardware and any necessary software for transmitting signals including, for example, data signals and/or control signals to the driver 13. The receivers may include hardware and any necessary software for receiving signals including, for example, data signals and/or control signals from the sensors 34.

The memory 2110 may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor 2120 may be implemented by at least one semiconductor chip disposed on a printed circuit board. The processor 320 may be an arithmetic logic unit, a digital signal processor, a microcomputer, a field programmable array, a programmable logic unit, a microprocessor or any other device capable of responding to and executing instructions in a defined manner.

The processor 320 may be programmed with instructions that configure the processor 320 into a special purpose computer to transmit, via the I/O device 2130, control instructions to control the driver 13 based on information provided by the sensors 34 such that the controller 2100 controls the assistance torque provided to the user based on the force measured by the sensors 34.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sensor device comprising:
a receiving body having an inserting space;
an inserting body configured to penetrate the inserting space;
a first sensor assembly including at least one first sensor between a first inner surface of the receiving body and a first surface of the inserting body; and
a second sensor assembly including at least one second sensor between a second inner surface of the receiving body and a second outer surface of the inserting body, wherein
the first sensor assembly and the second sensor assembly are on different sides of the inserting body in a direction of a thickness of the inserting body,
the at least one first sensor includes at least two first sensors spaced apart from each other, and
the at least one second sensor includes at least two second sensors spaced apart from each other such that the at least two second sensors are configured to overlap with respective ones of the at least two first sensors in the direction of the thickness of the inserting body, and
the at least one first sensor and the at least one second sensor are configured to generate information indicative of both a direction of a moment and a force applied to the receiving body by the inserting body.

2. The sensor device of claim 1, wherein the first sensor assembly and the second sensor assembly each comprise:
a force sensor configured to reduce an amount of resistance provided thereby when a force applied thereto increases.

3. The sensor device of claim 2, wherein the force sensor comprises:
a sensing plate between the inserting body and the receiving body;
a connector connected to the sensing plate lengthwise in a direction of the length of the inserting body;
a flexible plate configured to enclose the sensing plate and the connector; and
a connecting terminal connected to the connector and exposed to an external portion of the flexible plate.

4. The sensor device of claim 2, wherein
the at least two first sensors includes three first force sensors disposed non-collinearly, and
the at least two second sensors includes three second force sensors, the three second force sensors corresponding to the three first force sensors, respectively, with the inserting body therebetween.

5. The sensor device of claim 1, wherein the at least one first sensor and the at least one second sensor each comprise: force sensitive resistance (FSR) sensors.

6. The sensor device of claim 1, wherein one of the receiving body and the inserting body is formed of a flexible material.

7. The sensor device of claim 1, wherein
the at least two first sensors includes a first front sensor and a first rear sensor spaced apart from the first front sensor in a length direction of the inserting body, and
the at least two first sensors includes a second front sensor and a second rear sensor spaced apart from the second front sensor in the length direction of the inserting body.

8. The sensor device of claim 1, wherein
the at least two first sensors includes a first left sensor and a first right sensor spaced apart from the first left sensor in a direction perpendicular to a direction of the length of the inserting body, and
the at least two first sensors includes a second left sensor and a second right sensor spaced apart from the second left sensor in the direction perpendicular to the direction of the length of the inserting body.

9. The sensor device of claim 1, wherein one or more of the receiving body and the inserting body have protrusions protruding therefrom, the protrusions configured to prevent a separation of the inserting body from the receiving body.

10. The sensor device of claim 1, wherein the inserting body includes a first guide slot extending in the direction of the thickness of the inserting body, and the sensor device further comprises:
a first guide pin configured to penetrate the first guide slot to restrict a moving range of the inserting body.

11. The sensor device of claim 10, wherein the inserting body further includes a second guide slot spaced apart from the first guide slot and extending in the direction of the thickness of the inserting body, and the sensor device further comprises:
a second guide pin configured to penetrate the second guide slot to restrict a rotating range of the inserting body relative to the receiving body.

12. The sensor device of claim 1, wherein the inserting body comprises:
pressurizing portions that protrude from the inserting body towards one or more of the first sensor assembly and the second sensor assembly.

13. A sensor device comprising:
an inserting body having a shape such that a thickness thereof is less than a width and a length;
a plurality of sensor assemblies on different sides of the inserting body in a direction of the thickness of the inserting body, each of the plurality of sensor assemblies including at least one sensor, the plurality of sensor assemblies including,
a first sensor assembly having at least two first sensors spaced apart from each other, and
a second sensor assembly having at least two second sensors spaced apart from each other such that the at least two second sensors are configured to overlap with respective ones of the at least two first sensors in the direction of the thickness of the inserting body; and
a receiving body configured to enclose the inserting body and the plurality of sensor assemblies, wherein
the plurality of sensor assemblies are configured to generate information indicative of both a direction of a moment and a force applied to the receiving body by the inserting body.

14. The sensor device of claim 13, further comprising:
a sensing board including a processor configured to determine the direction of the moment and the force based on the information sensed by the plurality of sensor assemblies.

15. The sensor device of claim 14, wherein
the at least two first sensors includes a first front sensor and a first rear sensor spaced apart from the first front sensor in the direction of the length of the inserting body, and
the at least two second sensors includes a second front sensor and a second rear sensor, the second front sensor and the second rear sensor configured to overlap the first front sensor and the first rear sensor, respectively, in the direction of the thickness of the inserting body.

16. The sensor device of claim 15, wherein
the at least two first sensors further includes a first side sensor spaced apart from the first front sensor and the first rear sensor in a direction of the width of the inserting body, and
the at least two second sensors further includes a second side sensor configured to overlap the first rear sensor in the direction of the thickness of the inserting body.

17. The sensor device of claim 14, wherein
the at least two first sensors includes a first left sensor and a first right sensor spaced part from the first left sensor in the direction of the width of the inserting body, and
the at least two second sensors includes a second left sensor and a second right sensor, the second left sensor and the second right sensor configured to overlap the first left sensor and the first right sensor, respectively, in the direction of the thickness of the inserting body.

18. The sensor device of claim 14, wherein the processor is configured to,
determine the direction of the force applied in the direction of the thickness of the inserting body, and
determine directions of two moments applied about axes corresponding to directions of the width and the length of the inserting body, respectively.

19. The sensor device of claim 18, wherein the plurality of sensor assemblies comprises:
a first sensor assembly including three first sensors disposed non-collinearly, and
a second sensor assembly including three second sensors corresponding to the three first sensors, respectively, in the direction of the thickness of the inserting body with the inserting body therebetween.

20. The sensor device of claim 14, wherein the plurality of sensor assemblies comprises:
a first sensor assembly including two first sensors spaced apart from each other, and
a second sensor assembly including two second sensors corresponding to the two first sensors, respectively, in the direction of the thickness of the inserting body with the inserting body therebetween.

21. A sensor device comprising:
a plate having a first side and a second side opposite the first side;
a first sensor assembly including at least two first sensors configured to face the first side of the plate, the at least two first sensors being configured to sense a force applied to the plate in a first direction when the plate contacts the at least two first sensors; and
a second sensor assembly including at least two second sensors configured to face the second side of the plate to sense a force applied to the plate in a second direction when the plate contacts the at least two second sensors, the second direction being opposite the first direction, wherein
    the first sensor assembly and the second sensor assembly are on different sides of an inserting body in a direction of a thickness of the inserting body,
    the at least two second sensors are spaced apart from each other such that the at least two second sensors are configured to overlap with respective ones of the at least two first sensors in the direction of the thickness of the inserting body, and
    the at least two first sensors and the at least two second sensors are configured to generate information indicative of both a direction of a moment and a force generated by an inserting body.

22. The sensor device of claim 21, wherein the first sensor assembly and the second sensor assembly each comprise:
    a force sensor configured to reduce an amount of resistance provide thereby when the force applied thereto increases.

23. The sensor device of claim 22, wherein
    the first sensor assembly includes three first sensors disposed non-collinearly, and
    the second sensor assembly includes three second sensors, the three second sensors corresponding to the three first sensors, respectively, with the plate therebetween.

24. The sensor device of claim 21, wherein the at least two first sensors and the at least two second sensors each comprise:
    force sensitive resistance (FSR) sensors.

25. The sensor device of claim 21, further comprising:
    a sensing board including a processor configured to determine the direction of the moment and the force applied to the plate based on the information sensed by the first sensor assembly and the second sensor assembly.

* * * * *